United States Patent [19]

Takesue

[11] 4,136,383
[45] Jan. 23, 1979

[54] MICROPROGRAMMED, MULTIPURPOSE PROCESSOR HAVING CONTROLLABLE EXECUTION SPEED

[75] Inventor: Masaru Takesue, Higashikurume, Japan

[73] Assignee: Nippon Telegraph and Telephone Public Corporation, Tokyo, Japan

[21] Appl. No.: 778,566

[22] Filed: Mar. 17, 1977

Related U.S. Application Data

[63] Continuation-in-part of Ser. No. 616,576, Sep. 25, 1975, abandoned.

[30] Foreign Application Priority Data

1974 [JP] Japan .................................. 49-112984

[51] Int. Cl.² .......................... G06F 7/38; G06F 9/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,477,063 | 11/1969 | Anderson et al. | 364/200 |
| 3,535,694 | 10/1970 | Anacker et al. | 364/200 |
| 3,629,853 | 12/1971 | Newton | 364/200 |
| 3,631,405 | 12/1971 | Hoff et al. | 364/200 |
| 3,761,879 | 9/1973 | Brandsma et al. | 364/200 |
| 3,787,673 | 1/1974 | Watson et al. | 364/200 X |
| 3,806,881 | 4/1974 | Miwa et al. | 364/200 |
| 3,810,105 | 5/1974 | England | 364/200 |
| 3,815,095 | 6/1974 | Wester | 364/200 |
| 3,875,391 | 4/1975 | Shapiro et al. | 364/200 X |
| 3,879,712 | 4/1975 | Edge et al. | 364/200 |
| 3,964,055 | 6/1976 | Carruet et al. | 364/200 |
| 4,025,771 | 5/1977 | Lynch, Jr. et al. | 364/200 X |

*Primary Examiner*—Melvin B. Chapnick

[57] ABSTRACT

A multipurpose speed controllable processor composed of control memories for storing microprograms, register groups for storing instructions as well as data and the internal states of the processor, all of which serve as parts of the micro instructions, and arithmetic logic units which execute the micro instructions from the microprogram. The arithmetic logic units operate in accordance with operand addresses and codes designated in the micro instructions. Switches are provided for transferring the operand addresses of the micro instructions from the control memories to the register groups, for transferring the operands from the register groups to the arithmetic logic units, for transferring to the register groups the results of the operation of the arithmetic logic units, for transferring the operation codes from the control memories to the arithmetic units and for transferring to a control unit special status information of the operation results in the arithmetic logic units. Also provided is a control unit in which the microprograms execution speed is made controllable by writing control information in an execution speed setting register in the controller. Such control information serves to divide the control memories into valid and invalid parts. Also, the valid control memories are divided into an arbitrary number of control memory groups, each group being subdivided into an arbitrary number of control memory subgroups. The number of arithmetic logic units to be assigned to each control memory group is also controlled. Additionally, information designating the execution modes of the micro instructions stored in each control memory group is also included in the control information. The control unit controls the other parts so that micro instructions are simultaneously read out from one of the control memory subgroups of all the control memory groups. The read out micro instructions are simultaneously executed in the arithmetic logic units allocated to the control memory groups, and are equal in number to the arithmetic logic units allocated to the control memory groups. Upon execution of all the read out micro instructions, micro instructions of the next cycle and read out immediately or after a certain condition is fulfilled, depending upon the execution mode set in the control memory groups.

9 Claims, 36 Drawing Figures

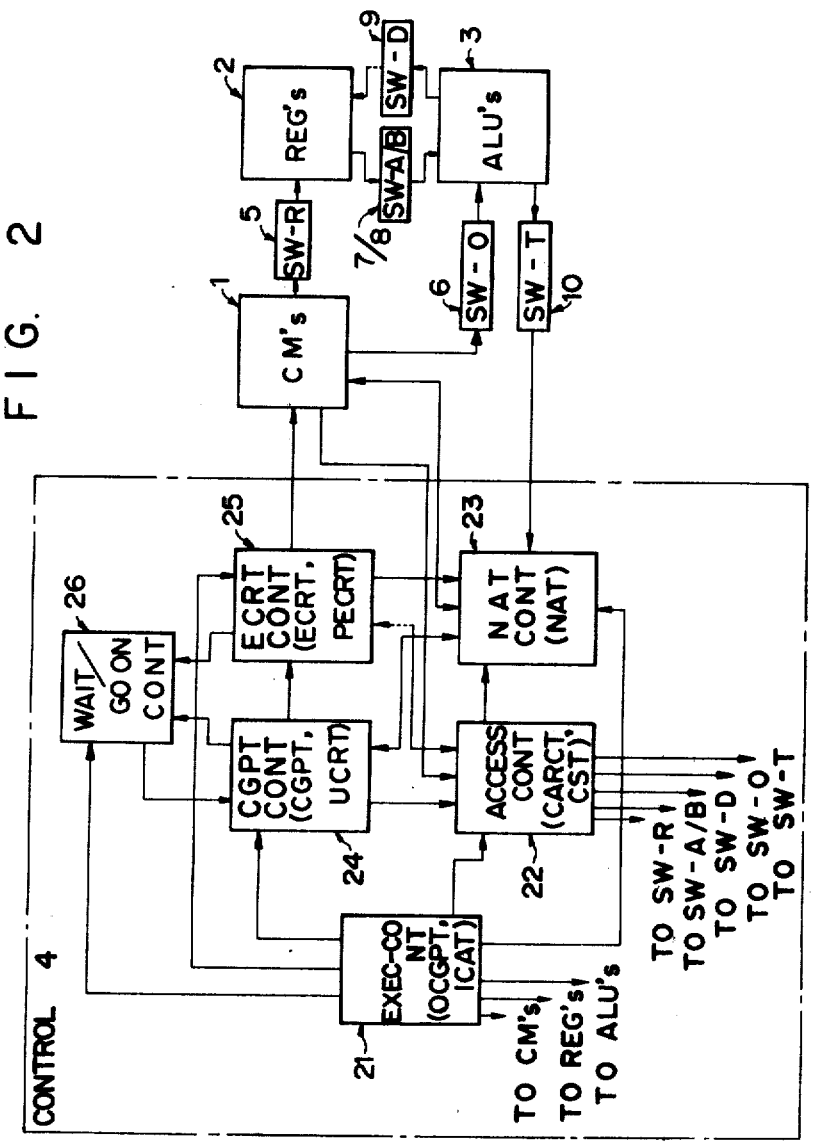

FIG. 3A

| NO. | Name of Register | Construction | Meaning of Bit |
|---|---|---|---|
| 1 | ICATi (Initial CM Address Table) | $L(ICATi)^{*1} = a+b$, $i=1,2,\cdots,\ell$ *2 | (i) $ICATi(1:a)$ *3; CMi address<br>(ii) $ICATi(a+1:a+b)$; address in CMi |
| 2 | OCGPTi (Original CGPT) | $L(OCGPTi) = \ell+2+w$, $i=1,2,\ldots,\ell$ | (i) $OCGPTi(1:\ell)$; bit $k(1 \leq k \leq \ell)$<br>$= \begin{cases} \text{"1" (indicating that CMk is included in the Control memory group i (i.e. CGi)} \\ \text{"0" (other cases)} \end{cases}$<br><br>(ii) $OCGPTi(\ell+1)$;<br>$= \begin{cases} \text{"1" (indicating that CGPTi is significant)} \\ \text{"0" (indicating that CGPTi is insignificant)} \end{cases}$<br>(iii) $OCGPTi(\ell+2)$;<br>"1" (indicating that this CM Group (CG) is in go on mode)<br>"0" (indicating that this CG is in Wait mode)<br><br>(iv) $OCGPTi(\ell+2+1 : \ell+2+w)$;<br>Indicating the number of ALU's assigned to this CG. w is a minimum integer satisfying $2^w \geq n$.<br>n is the maximum number of ALU's connectable. |
| 3 | CGPTi (CM Group Pattern Table) | $L(CGPTi) = \ell+3$, $i=1,2,\ldots,\ell$ | (i) $CGPTi(1:\ell) = OCGPTi(1:\ell)$;<br>However, in the case of CGi containing sub-CG for serial processing, only 1 bit of sub-CG corresponding to CM to be read out in that cycle is "1" and the other bits are all "0".<br><br>(ii) $CGPTi(\ell+1) = OCGPTi(\ell+1)$<br><br>(iii) $CGPTi(\ell+2) = OGGPTi(\ell+2)$<br><br>(iv) $CGPTi(\ell+3)$;<br>$= \begin{cases} \text{"1" (instructing to read out MP instructions from CM belonging to CGi in this cycle)} \\ \text{"0" (other cases)} \end{cases}$ |
| 4 | UCRT (Used CM Resource Table) | $L(UCRT) = \ell$ | $UCRT = \bigvee_i CGPTi(1:\ell \mid \ell+1=1)$ *4 |

FIG. 3B

| No. | Name of Register | Construction | Meaning of Bit |
|---|---|---|---|
| 5 | CARCTi (CM-ALU-REG Connection Table) | $L(CARCTi) = a+b+c+d+e$, $i = 1, 2, \cdots, \ell$ | (i) CARCTi(1 : a); CMi address<br>(ii) CARCTi(a+1 : a+b); A-REG address contained in MP instruction read out from CMi.<br>(iii) CARCTi(a+b+1 : a+b+c); B-REG address contained in MP instruction read out from CMi.<br>(iv) CARCTi(a+b+c+1 : a+b+c+d); D-REG address contained in MP instruction read out from CMi.<br>(v) CARCTi(a+b+c+d+1 : a+b+c+d+e); Address of ALU executing MP instruction read out from CMi. |
| 6 | CSTi (CM Selection Table) | $L(CSTi) = \ell$, $i = 1, 2, \ldots, \ell$ | (i) CSTi(1 : $\ell$) = CGPTi(1 : $\ell$) $\wedge$ ECRT |
| 7 | ECRT (Execution CM Resource Table) | $L(ECRT) = \ell$ | bit i ($1 \leq i \leq \ell$);<br>"1" (indicating that execution of MP instruction read out from CMi has not been finished)<br>"0" (indicating completion) |
| 8 | PECRT (Pseudo ECRT) | $L(PECRT) = \ell$ | bit i ($1 \leq i \leq \ell$);<br>"1" (indicating CMi to be read out in next CM read cycle) "0" (other cases) |
| 9 | NATi (Next Address Table) | $L(NATi) = 2a + b + c$ $i = 1, 2, \ldots, \ell$ | (i) NATi(1 : a); CMi address<br>(ii) NATi(a+1 : 2a); address of CM having stored therein MP instruction to be read out next cycle, contained in MP instruction read out from CMi.<br>(iii) NATi(2a+1 : 2a+b); address in CM having stored therein MP instruction to be read out next cycle, contained in MP instruction read out from CMi.<br>(iv) NATi(2a+b+1 : 2a+b+c); results of execution of MP instruction in previous cycle, etc. |

Note:

*1    L(X); bit length of X

*2    $\ell$ ; maximum number of CM's connectable

*3    X(p:q); pth to qth bits of X

*4    $\vee_i$ Xi (p:q | r:s = Y); result of ORing of Xi's(p:q) of all Xi's satisfying Xi(r:s) = Y for each bit.

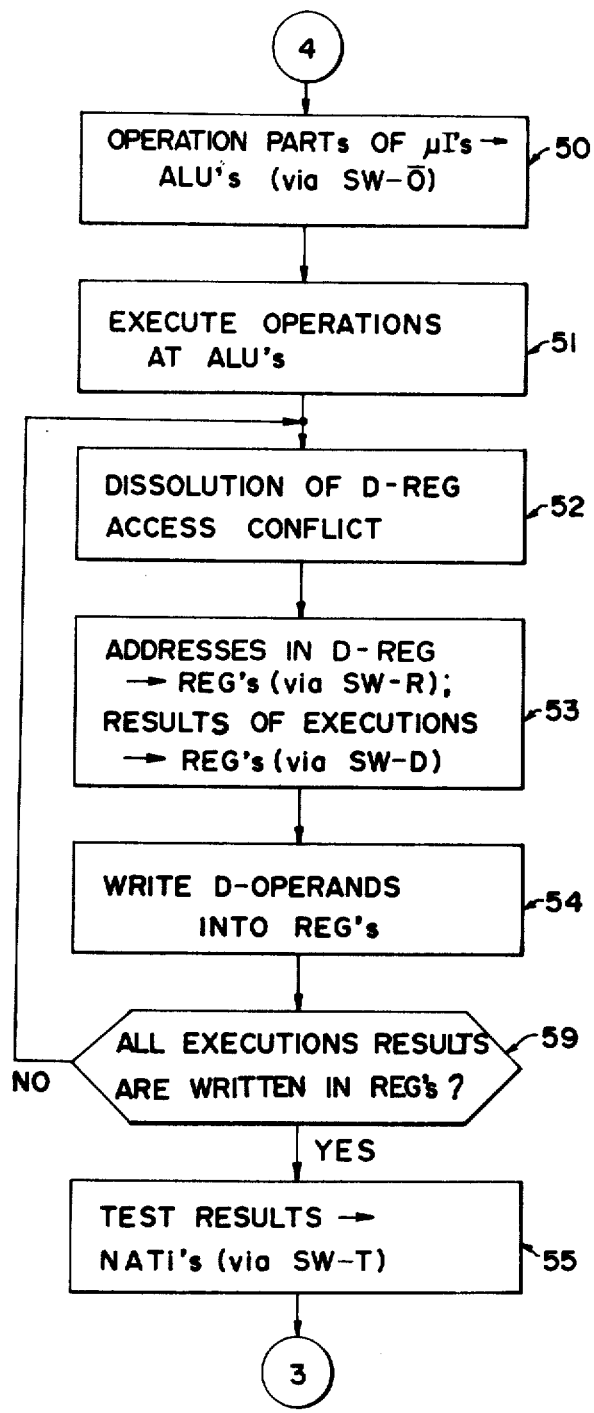

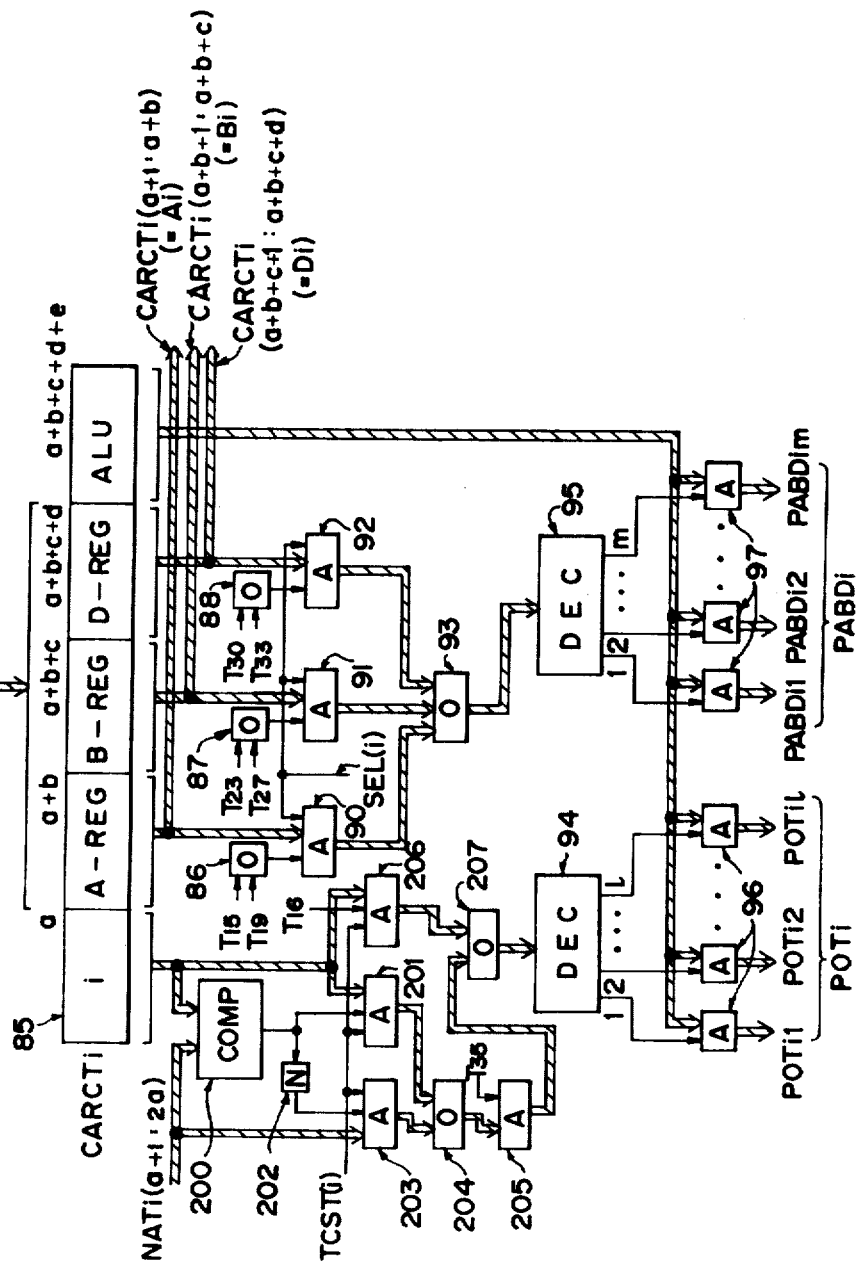

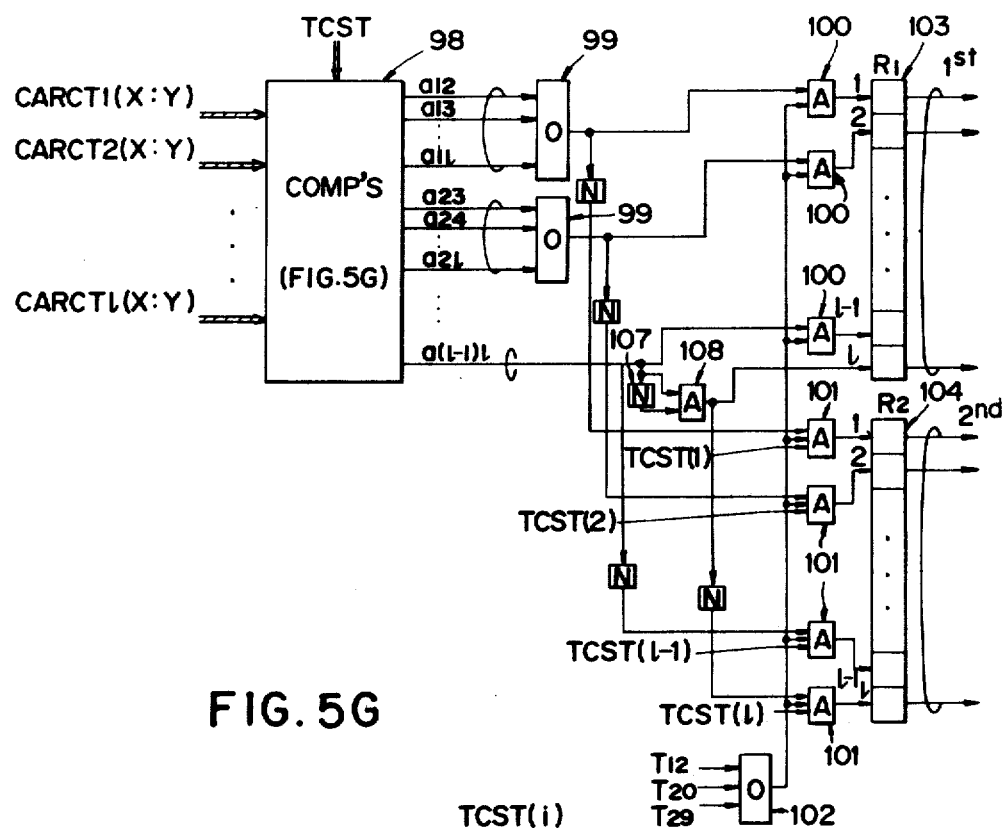
FIG. 5F
FIG. 5G
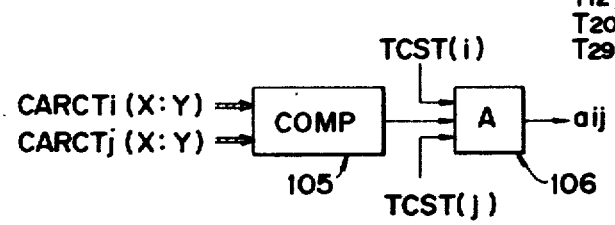
$(i > j;\ i = 1, 2, \cdots, l-1;\ j = 2, 3, \cdots, l)$

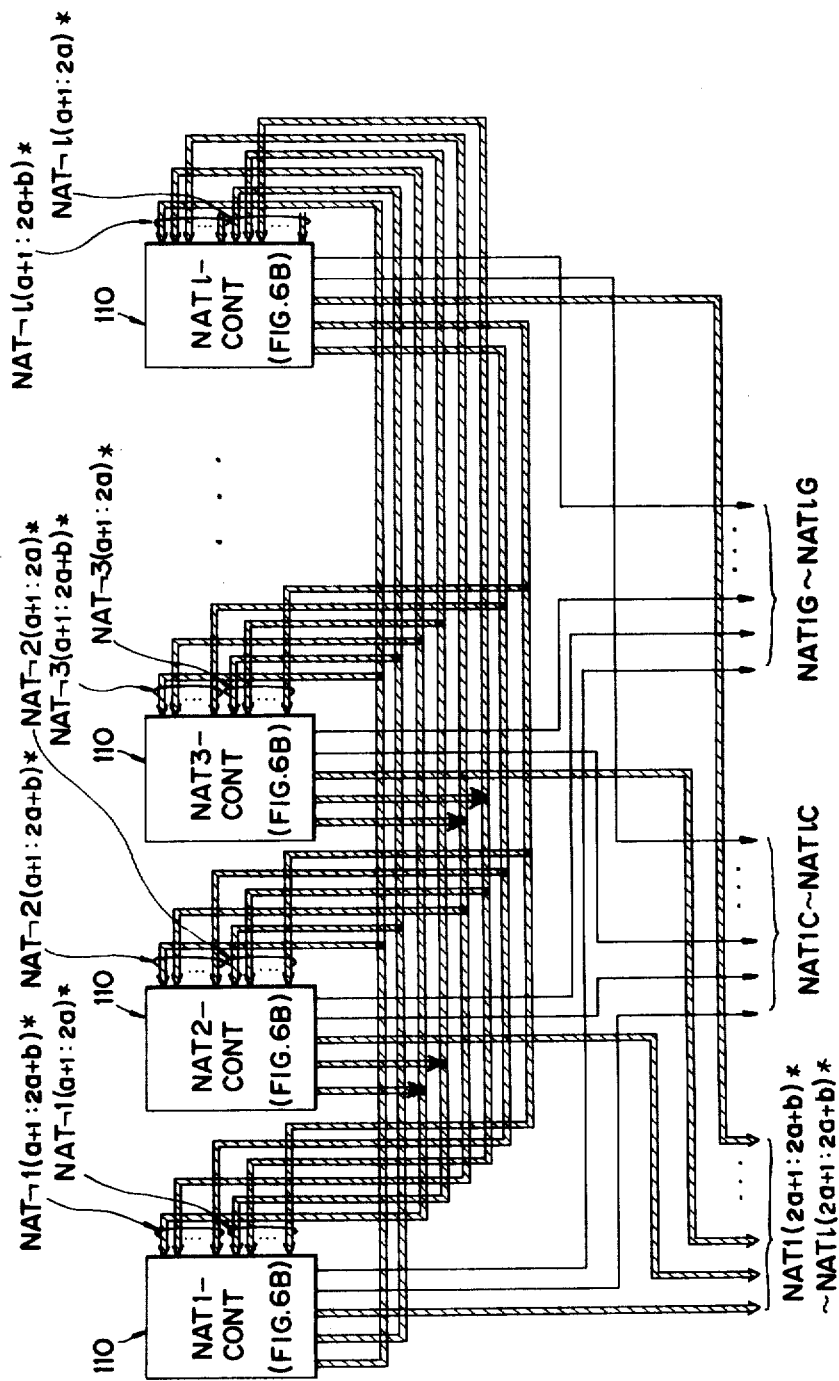

F I G. 6D
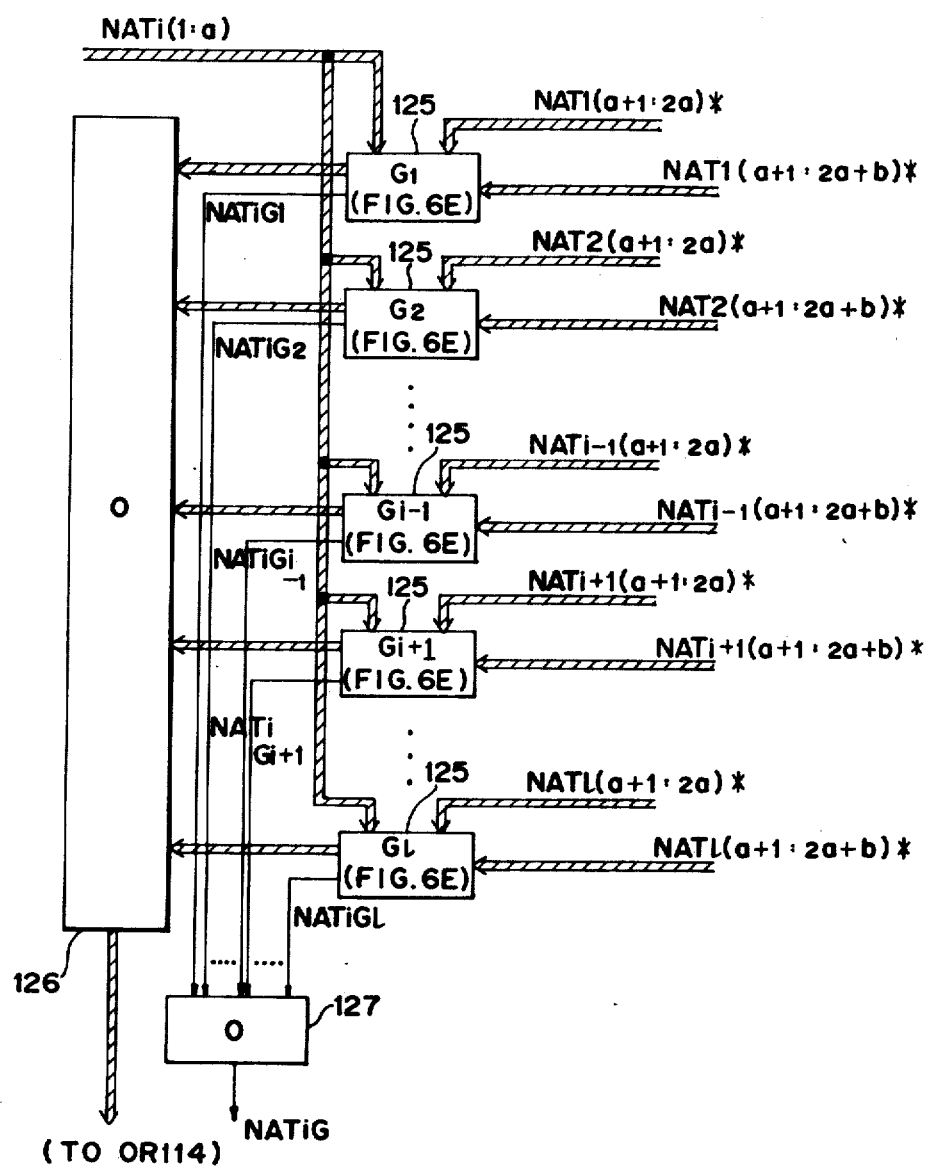

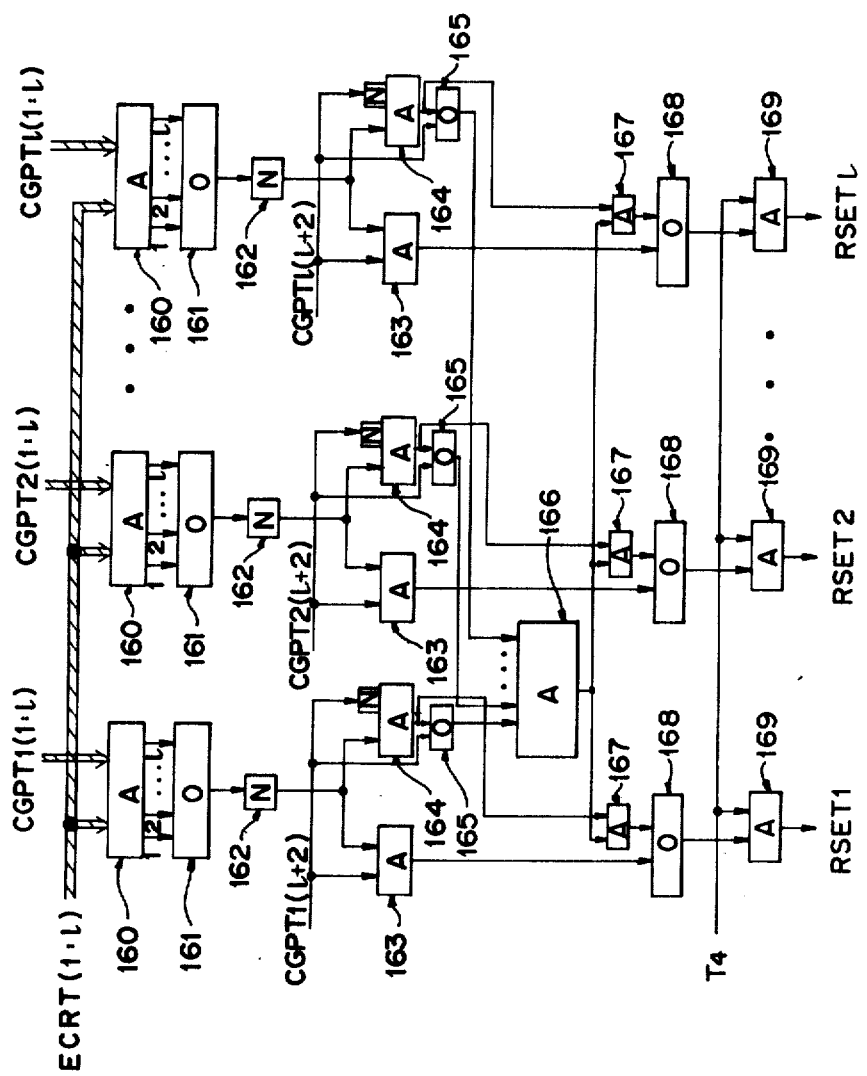

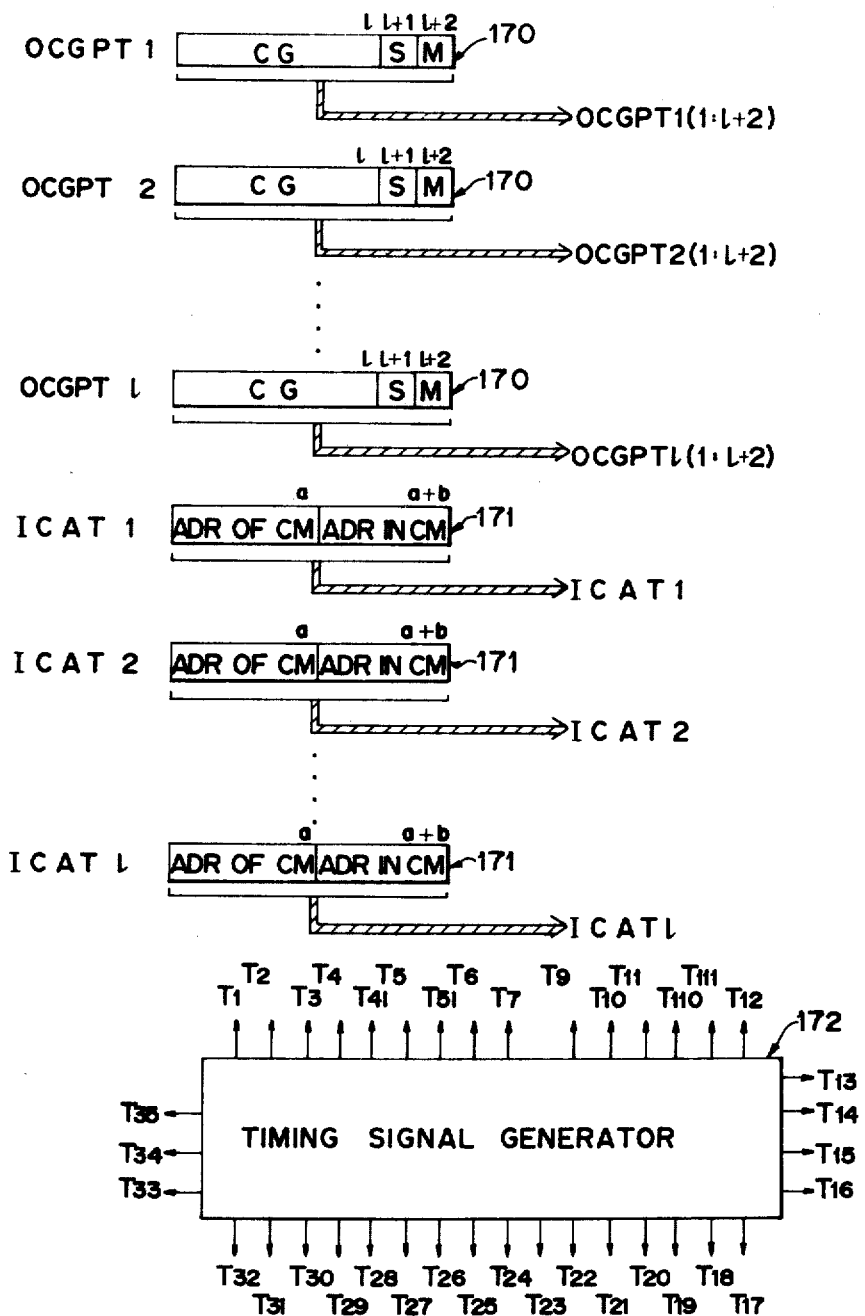

| O | A | A' | B | B' | D | D' | R | R' | M |
|---|---|---|---|---|---|---|---|---|---|
| | A BUS·ADDRESS | | B BUS·ADDRESS | | D BUS·ADDRESS | | CM NEXT ADDRESS | | |
| OPERATION PART | A-REG ADDRESS | ADDRESS IN A-REG | B-REG ADDRESS | ADDRESS IN B-REG | D-REG ADDRESS | ADDRESS IN D-REG | CM ADDRESS | ADDRESS IN CM | OTHERS |

| NAME OF STEPS GROUP | NO OF STEP (TIMING) |
|---|---|
| CM SELECTION (CM(S)) | 43($T_{110}$)→44($T_{111}$)→45($T_{111}$)→34($T_4$)<br>35($T_{41}$)→36($T_5$)→37($T_{51}$) |
| CM READ (CM(R)) | 38($T_6$) |
| REG SELECTION (REG(S)) | 39($T_7$)→40($T_9$)→41($T_{10}$)→42($T_{11}$) |
| A/B-REG READ (A/B-REG(R)) | 46($T_{12}$)→47($T_{13}$)→48($T_{14}$)→49($T_{15}$)→50($T_{16}$)<br>46($T_{16}$)→47($T_{17}$)→48($T_{18}$)→49($T_{19}$)<br>46($T_{20}$)→47($T_{21}$)→48($T_{22}$)→49($T_{23}$)<br>46($T_{24}$)→47($T_{25}$)→48($T_{26}$)→49($T_{27}$) |
| EXECUTION (EXEC) | 51($T_{28}$) |
| D-REG WRITE (D-REG(W)) | 52($T_{29}$)→53($T_{30}$)→54($T_{31}$)<br>52($T_{32}$)→53($T_{33}$)→54($T_{34}$)→55($T_{35}$) |

MICROPROGRAMMED, MULTIPURPOSE PROCESSOR HAVING CONTROLLABLE EXECUTION SPEED

BACKGROUND OF THE INVENTION

1. Field of the Invention

This invention relates to a multipurpose speed controllable processor for controlling various secondary storage devices for use in an information processing system.

2. Description of the Prior Art

In the past, I/O controllers have each been designed and constructed based on wired logic to have desired functions and processing efficiencies which comply with particular requirements. Accordingly, in the case of using an I/O device of a novel function and/or improved efficiency, it is necessary to design and construct a novel I/O controller for the exclusive use of such an I/O device which requires large development costs and many designers.

However, since the International Business Machines Corporation has adoped microprogram (MP) controlled logic in an I/O controller for the 2314 magnetic disk device in 1965, almost all I/O controllers have been shifted to the MP controlled logic.

As is known in the art, the I/O controller of the MP controlled logic has advantages such as (i) low cost, (ii) easy and accurate diagnosis, (iii) shortened design and debugging processes and (iv) high flexibility. When adding a new function, the I/O controller of the MP controlled logic type need not be reconstructed as much as the wired logic type I/O controller. Nevertheless, even in the MP controlled logic type, the new function cannot be added without any reconstruction.

Theoretically, various functional differences can be settled by the replacement of microprograms but no multipurpose speed controllable processor capable of such replacement has been put in practical use for the following reasons. Firstly, it is uneconomical that the I/O controller retains, as a multipurpose device, a variety of functions and speeds and secondly it is difficult to sharply shorten the read cycle time of a control memory (CM) for technical and economical reasons.

With the I/O controller of the microprogram controlled logic, however, by utilizing its high flexibility, which is the abovesaid advantage (iv), it is theoretically possible to provide a multipurpose speed controllable processor capable of performing a variety of functions. A typical one of the conventional I/O controllers using the MP controlled logic (for example, IBM 2314 I/O controller, i.e., IBM 2844) performs the I/O control by changing and modifying its internal state, the I/O information, etc. stored in two register groups, under the control of MP instructions stored in the CM, and it is therefore possible to realize an I/O controller of different functions by rewriting the microprograms in the CM. Accordingly, if the device has a sufficient speed and sufficient control memory capacity, it can be used as a multipurpose speed controllable processor. However, this is very uneconomical, and hence is not preferred for practical use. The read cycle time of the CM (that is the sum of the read time of the element itself and the time spent in read circuits), which is technically and economically proper at present is about 100 ns at minimum. It is considered that substantial reduction of the read cycle time cannot be expected even in the future. On the other hand, on the side of the I/O controller, a magnetic drum controller having a transfer cycle of about 500 ns has been put in practical use even at present. In the case of the I/O controller of the MP controlled logic, since it is desirable to execute about ten steps of MP instructions during one transfer cycle, it is appreciably difficult even under existing circumstances to largely adopt the MP controlled logic in the magnetic drum controller. In view of this, future I/O controllers of higher speed will inevitably again adopt the wired logic instead of the MP controlled logic to comply with the requirement for higher speed. Also, with the conventional MP controlled logic, it is difficult to realize multipurpose speed controllable processor usable with future I/O controllers. Further, offsetting of various advantages of the MP controlled logic by use of the wired logic is a significant loss in practical use.

An I/O controller controlled using parallel MP operation is known, (for example, U.S. Pat. No. 3,654,617 issued Apr. 4, 1972). An speed controllable processor effecting dynamic allocation of the MP instruction cycle to a multiplex type I/O device and an speed controllable processor providing a long and a short word for reducing the control memory capacity are also known (for example, U.S. Pat. Nos. 3,766,524 issued Oct. 16, 1973 and 3,673,575 issued June 27, 1972, respectively). Further, a multipurpose I/O controller which raises the processing speed by simultaneously reading out two words is also known (for example, U.S. Pat. No. 3,753,236 issued Aug. 14, 1973). However, none of these satisfies simultaneously both the requirements of functions and speeds covering wide ranges for multipurpose speed controllable processor.

SUMMARY OF THE INVENTION

One object of this invention is to provide a multipurpose speed controllable processor with which it is possible to realize any I/O controller having desired functions and processing efficiencies, such as for example, a magnetic drum controller, a magnetic disk pack controller, a magnetic tape controller, or the like.

Another object of this invention is to provide an economical multipurpose speed controllable processor which is capable of both speed control and high-speed operation.

Another object of this invention is to enable economical and rapid design and construction of an I/O controller having desired functions and processing efficiencies to thereby sharply reduce the expenditure and time for development of new I/O controllers and to increase the feasibility of Large Scale Integration (LSI) for I/O controllers by duplication of hardware among various I/O controllers.

With the present invention, a desired I/O controller can be constructed by connecting suitably selected subsets of a maximum number of connectable resources including CM's (control memories) REG's (register groups) and ALU's (arithmetic logic units), similar to a building block system, and by writing microprograms in the CM's.

Namely, the multipurpose speed controllable processor of this invention employs (a) a building block system capable of increasing or decreasing the number of resources in response to a request, (b) a system capable of setting the executing speed of the microprogram in response to a request and (c) a parallel MP execution system.

Further, in the present invention, the aforesaid control functions are all accomplished by the following six controls. The controls are an ACCESS control for controlling simultaneous accesses to REG and a switching control based thereon; a NAT (Next Address Table) control for determining the addresses in CM's to be read out in the next cycle based on the result of tests; a CGPT (Control Memory Group Pattern Table) control for achieving dynamic identification and display of the CM used in each cycle; an ECRT (Execution CM Resource Table) control for effecting identification and and display of the running state of the readout MP instruction group and determining the CM to be read out in the present cycle; a Wait/Go-On control for determining the CM to be read out in the next cycle and setting and/or resetting determined bits in CGPT; and an execution control for making a synchronizing control of operations among the abovesaid controls.

BRIEF DESCRIPTION OF THE DRAWINGS

FIG. 2 is a block diagram illustrating a multipurpose speed controllable processor similar to FIG. 1 with the CONTROL 4 being shown in detail;

FIGS. 3A and 3B are logical specifications of registers used in the CONTROL 4 shown in FIG. 2;

FIGS. 4A, 4B, and 4C are flow charts of the operation of FIG. 2;

FIGS. 5A to 5G are block diagrams showing in detail the ACCESS control circuit (ACCESS CONT) of FIG. 2;

FIGS. 6A to 6E are block diagrams showing in detail the NAT control circuit (NAT CONT) of FIG. 2;

FIG. 9 is a block diagram showing in detail the Wait/Go-on control circuit (Wait/Go-on CONT) of FIG. 2;

FIG. 10 is a block diagram showing in detail the execution control circuit (EXEC CONT) 21 of FIG. 2;

DESCRIPTION OF THE PREFERRED EMBODIMENTS

Figure 1:
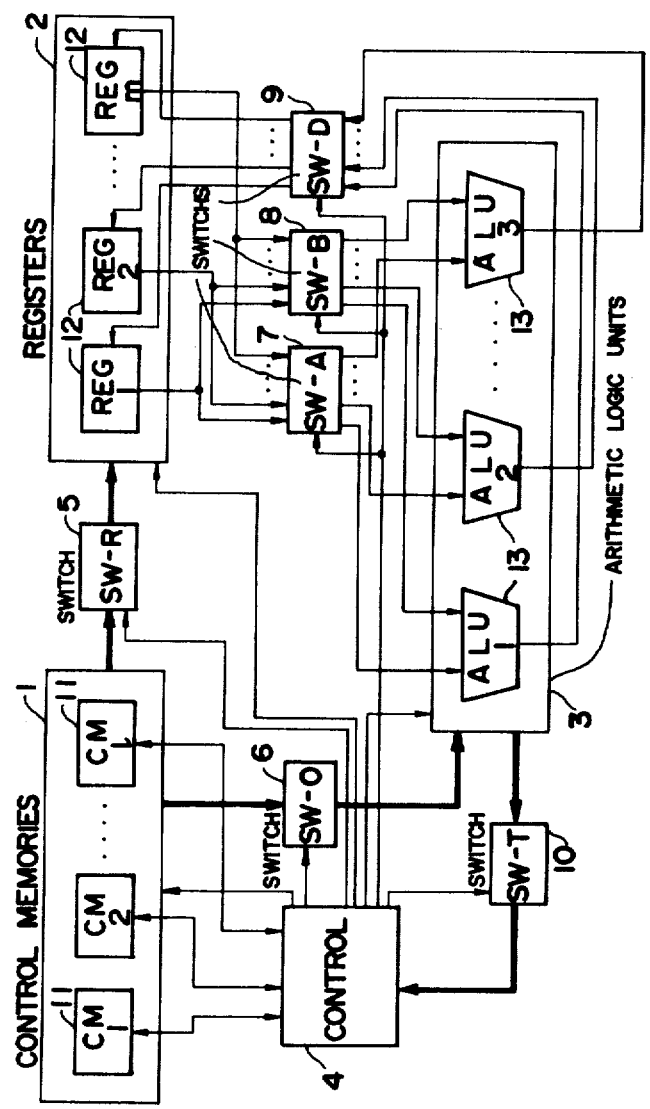
FIG. 1 is a block diagram illustrating a multipurpose speed controllable processor in accordance with one example of this invention.

FIG. 1 illustrates one embodiment of the present invention. Reference numeral 1 indicates a CM group comprising l control memories for storing microprograms, each control memory having an appropriate capacity of, for example, 32 bits × 256 words. Reference numeral 2 designates a REG group comprising m register groups for storing the internal states of apparatus, etc., each register group having an appropriate capacity of, for example, 8 bits × 16 words. Reference numeral 3 denotes an ALU group comprising n arithmetic-logic units, each unit having appropriate arithmetic and logical operation functions such as for example, AND, OR, EOR, +, etc. Reference numeral 4 identifies a CONTROL for controlling each part of the present apparatus, which will be later described in detail. Reference numeral 5 represents a switch R(SW-R) through which register address parts in the MP instructions read out from a plurality of CM's are properly transferred to a plurality of REG's in accordance with instructions of the CONTROL. Reference numeral 6 shows a switch O (SW-O) by which the operation parts in the MP instructions read out from a plurality of CM's are appropriately transferred to a plurality of ALU's in accordance with instructions of the CONTROL. Reference numerals 7 and 8 refer to switches A(SW-A) and B(SW-B) by which the information read out from a plurality of REG's are appropriately transferred to inputs A and B of a plurality of ALU's in accordance with instructions of the CONTROL. Reference numeral 9 indicates a switch D(SW-D) by which the results of operations in the plurality of ALU's are appropriately transferred to a plurality of REG's in accordance with instructions of the CONTROL. Reference numeral 10 designates a switch T(SW-T) by which special status of the results of the operations in the plurality of ALU's, for example, all zero, carry, plus, minus or the like, is appropriately transferred to determined places in the CONTROL in accordance with instruction thereof.

The CM group 1, the REG group 2 and the ALU group 3 form the resources capable of being used in the present multipurpose I/O controller. A particular design and construction of a desired exclusive I/O controller is achieved by adopting such arrangements that appropriately selected ones of the l CM's, m REG's and n ALU's can be connected to the I/O controller and that the other remaining ones can easily be disconnected therefrom. In this way it is possible to eliminate the redundancy of hardware in forming an exclusive I/O controller, and hence reduce the cost of construction.

The microprograms which are written in the selectively connected CM1, CM2, . . . , CMx$_l$ (x$_l$≦l) are x$_l$ control routines for an I/O control operation, and are carried out in parallel or in a series manner.

The functions of an ordinary I/O controller for example, a magnetic tape controller, include (1) a channel interface control, (2) a device interface control, (3) generation of status byte and a sense byte, (4) a data buffer control, (5) a data format control, (6) MOD/DE-MOD, (7) generation and check of an error correcting code and (8) a panel control.

In the present invention, microprograms corresponding to these functions are written in control memories CM1, CM2, . . . CMx$_l$ and the internal status work areas of the device controlled by these microprograms are assigned to the selectively connected register groups REG1, REG2, . . . REGx$_m$ (x$_m$≦m). For the execution of operations based on a plurality of MP instructions read out of the CM group, the ALU1, ALU2 . . . ALUx$_n$ (x$_n$≦n) which are selectively connected, are assigned to the CM's.

With such an arrangement, it is possible to achieve a predetermined I/O control operation by sequentially reading out and executing the MP instructions. However, the above construction encounters the following problems. (1) A control for resolution of the memory access conflict in the case where more than one of the addresses for accessing the REG's designated in the MP instructions read out of the CM's happen to have the same REG address. (2) A control for coordination of the CM's with the ALU's since the coordination is not always 1 to 1. That is, when some MP has a high degree of serial requirements in its execution order (i.e. it is impossible of parallel execution and has too many steps to be stored in one CM, the coordination of s CM's with an ALU is required) (case 1). Additionally, the processing speed with respect to a MP is required to be decreased in some cases. In these cases the coordination of s CM's with t ALU's (sCM-tALU, $s \geq t$) is required (case 2). For example, where a program of P1 of a CM1 and a program of P2 of a CM2 can be processed in parallel, the processing speed in the case of the two CM's (CM1 and CM2) being connected to one ALU is ½ that in the case of the two CM's (CM1 and CM2) being respectively connected to different ALU's. Further, where the abovesaid programs P1 and P2 of CM1 and CM2 cannot be processed in parallel, it is necessary to connect the two CM's to one ALU. Thus, the construction of sCM-tALU ($s \geq t$) is necessary. (3) A control to decide which t MP instructions out of s read out MP instructions are to be executed in parallel in the execution cycle in the case of the above-mentioned case 2. (4) A control to decide an address of a CM in the case of the above-mentioned case 1 in the CM's read-out cycle.

To settle these problems, this invention employs a control circuit (CONTROL) 4 in addition to the CM's, REG's and ALU's. The CONTROL 4 performs the abovesaid controls and a control of other elements of the present apparatus.

FIG. 2 shows in block form one embodiment of the CONTROL of this invention, and its associated parts.

In FIG. 2 reference numeral 21 indicates an EXEC control for designating and controlling the sequence of operation of the other blocks, and this control places under its control an Original Control Memory Group Pattern Table (hereinafter referred to as OCGPT) and an Initial Control Memory Address Table (hereinafter referred to as ICAT). Reference numeral 22 designates an ACCESS control, which controls the concurrent requests for accessing the same REG, mentioned above in item (1) and controls switches 5 to 10 associated therewith by the use of a CM ALU REG Connection Table (hereinafter referred to as CARCT) and a CM Selection Table (hereinafter referred to as CST). Reference numeral 23 identifies a NAT control, which determines the addresses of the CM's to be read out in the next cycle and the addresses therein by the use of a Next Address Table (hereinafter referred to as NAT). Reference numeral 24 denotes a CGPT control, which updates a Control Memory Group Pattern Table (hereinafter referred to as CGPT) obtained by the modification by NAT of the content of OCGPT designated in the design and construction of the exclusive I/O controller, and updates a Used Control Memory Resource Table (hereinafter referred to as UCRT) obtained by OR operation of the contents of CGPT, thereby supplying the controllers 22, 25 and 26 with information necessary for their operations. Reference numeral 25 represents an ECRT control, which updates an Execution Control Memory Resource Table (hereinafter referred to as ERCT) showing the executing state of the MP instructions read out from the CM's and a Pseudo ECRT (hereinafter referred to as PECRT) indicating the address of the CM from which microprogram instructions should be read out in the present cycle, thereby supplying the controllers 1, 22, 23 and 26 with information necessary for their operations. In the case of the coordination of sCM-tALU for decreasing the processing speed, fine speed control can be obtained by designating one operation mode so that the execution of s MP instructions read out from sCM's (CM group, CG) is immediately followed by the execution of the next s MP instructions read out from the same CG as the above in the next cycle (Go-On mode) and another operation mode so that, after completion of execution of all the MP instructions read out from all the other CG's in the Wait mode of operation, the next s MP instructions are read out from the same CG and executed (Wait Mode). Reference numeral 26 designates a Wait/Go-On control, which determines the CG's to be read out in the next cycle based on the designation of the Wait/Go-on mode of operation of each CG designated in the CGPT and the executing state of the read out MP instructions designated in ECRT, thus setting or resetting determined bits in CGPT.

FIGS. 3A and 3B show the construction of the abovesaid tables and the meanings of the bits.

In the tables of FIGS. 3A, and 3B, for example, ICATi is a register showing addresses of CMi at the start of the operation of the apparatus. The bit length L of this register is a+b and bits 1 to a of them represent the address of each CMi and bits a+1 to a+b represent the address in the CMi. The OCGPTi is a register showing the pattern of the CM group i. The bit length of this register is l +2+w. When a bit k of the bits 1 to l is "1", it means that CMk belongs to the control memory group i(CGi). When the bit l +1 is "1", it indicates that the register (and accordingly, CGi) is valid and when this bit is "0" it indicates that the register is invalid. Further, when the bit l +2 is "1", the Go-On mode is indicated and when this bit is "0", the Wait mode is indicated. The bits l+2+1 to l +2+w represent the number of ALU's assigned to the CGi. UCRT is a register to retain addresses of the CM's used and the bit length L is l.

Figure 4A:
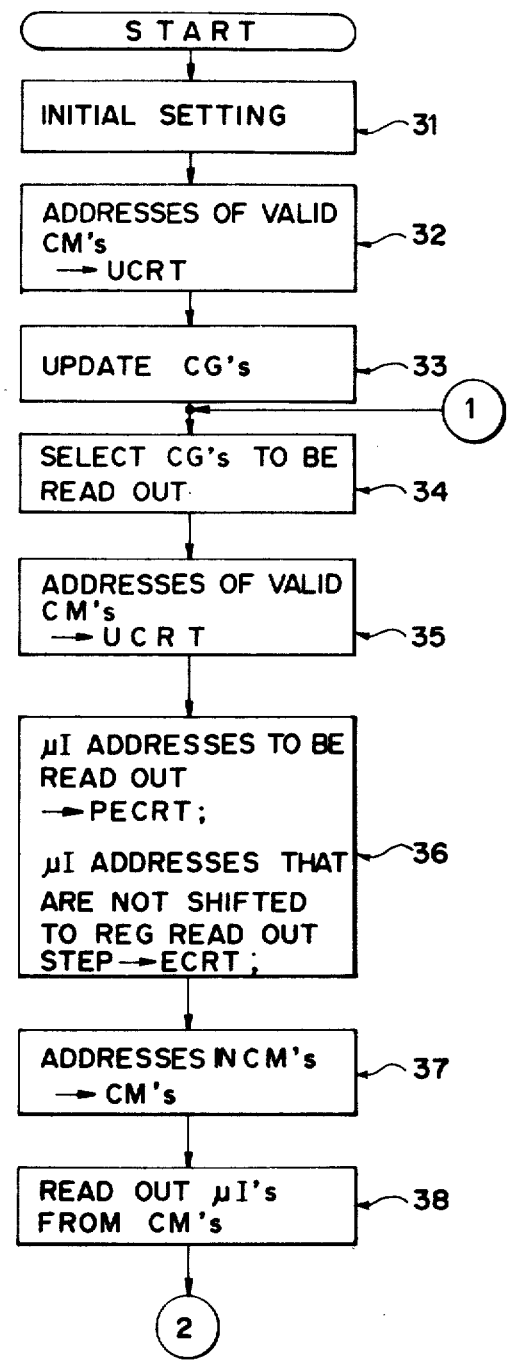
Figure 4B:
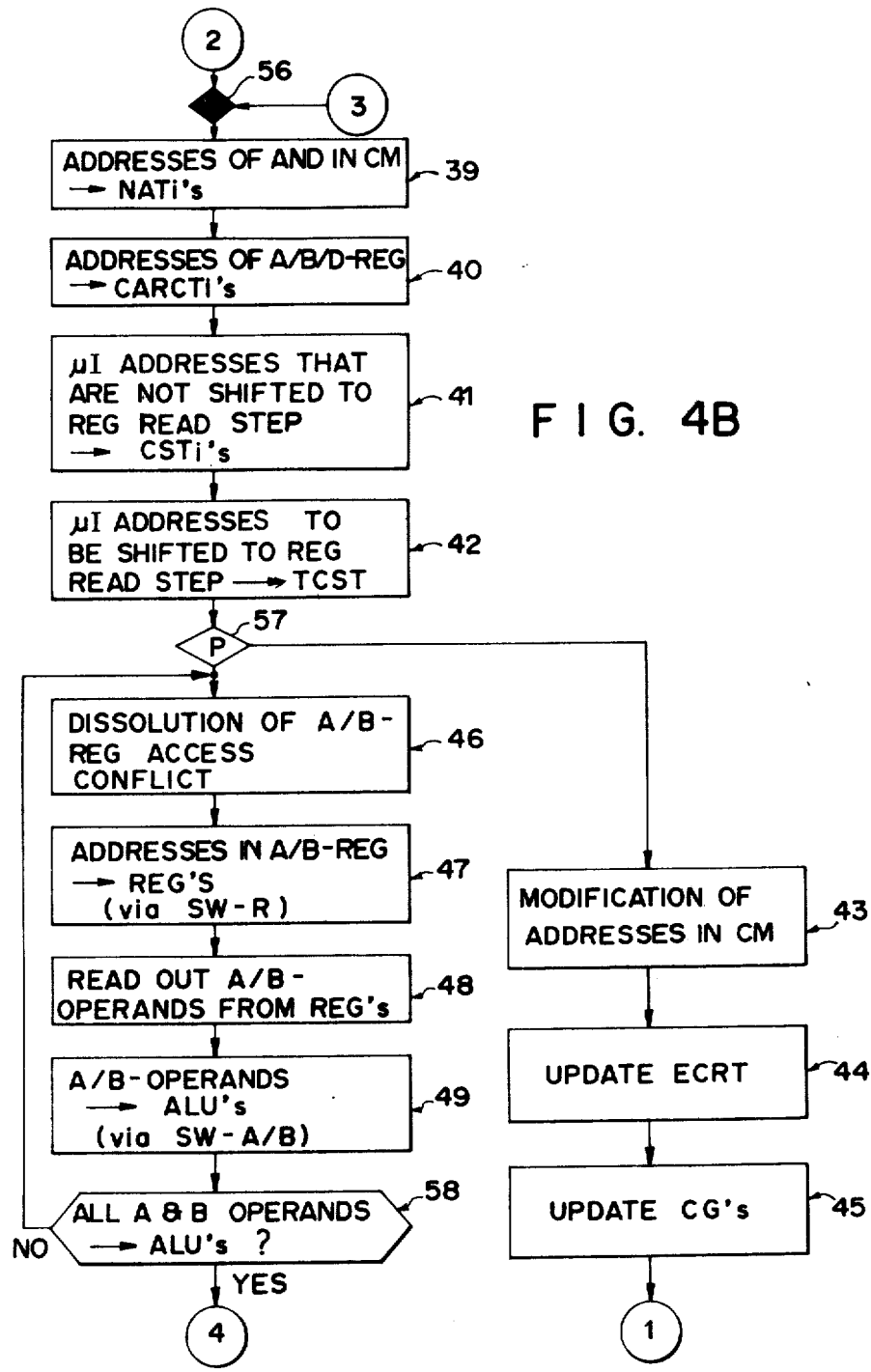

The contents of the other tables will become apparent from the description taken in conjunction with the flow charts of FIGS. 4A, 4B and 4C.

In FIGS. 4A, 4B and 4C, a description of the control of the sCM-tALU coordination is shown with regard to the case of t=1 for the sake of simplicity, but the case of t > 1 can also be readily realized.

FIG. 5A to 5G, 6A to 6E, 7A, 7B, 8 to 13 and 14A to 14F respectively illustrate concrete examples of the logic circuits which performs the control operation.

Table 1

| Step | Operations | CONT |
|---|---|---|
| | Transfer CMs addresses contained in CGi (= OCGPTi(1 : l)), validity of CGi (= OCGPTi(l + 1)) and operation mode of CGi (OCGPTi(l + 2)) to CGPTi(1 : l+2) (i = 1, 2, ... l). | CGPT CONT |
| | Transfer start address of MP contained in CMi(= ICATi(1 : | |

Table 1-continued

| Step | Operations | CONT |
|---|---|---|
| 31 | a+b)) to NATi(a+1 : 2a+b) (i = 1, 2, ... l). | NAT CONT |
|  | Transfer number of ALUs designated to CGi, assign ALU addresses to CGi and transfer the addresses to CARCTjs (i = 1, 2, ... l). | ACCESS CONT |
| 32 | Transfer addresses of CMs contained in valid CGi(= CGPTi (1 : l\|l+1 = "1")) to UCRT (i = 1, 2, ... l). | CGPT CONT |
| 33 | Update CGPTi(1 : l) and NATi (a+1 : 2a+b) in connection with sub-CGs in CGi (i = 1, 2, ... l). | NAT CONT |
| 34 | Set CGPTi(l+3) = "1" if read operations of Cms contained in CGPTi are to be carried out at this cycle (i = 1, 2, ... l). | Wait/Go-On CONT |
| 35 | (same with step 32) | CGPT CONT |
| 36 | Update ECRT and PECRT, that is: $[\bigvee_{i=1}^{l} CGPTi(1 : l\|l + 3 = "1")] \vee ECRT \rightarrow ECRT;$ | CGPT CONT, |
|  | $\bigvee_{i=1}^{l} CGPTi (1 : l\|l + 3 = "1") \rightarrow PECRT$ | ECRT CONT |
| 37 | Transfer address in CMi of MP instruction to be read out next step (= NATi(2a+1 : 2a+b)) to address register of CMi. | NAT CONT |
| 38 | Read out MP instruction from CMi when PECRT(i) = "1" (i = 1, 2, ... l). | CM group |
| 39 | Transfer addresses of and in CM which are contained in the data register of CMi to NATi(a+1 : 2a+b) when PECRT(i) = "1" (i = 1, 2, ... l). | NAT CONT |
| 40 | Transfer addresses of A-REG,B-REG and D-REG which are contained in the data register of CMi to CARCTi (a+1 : a+b+c+d) when PECRT(i) = "1" (i = 1, 2, ... l). | ACCESS CONT |

Table 2

| Step | Operations | CONT |
|---|---|---|
| 41 | Transfer addresses of such CMs contained in CGi that the MP instructions read out from them are not yet shifted to REG read cycle to CSTi(1 : l), that is, CGPTi(1 :l) $\wedge$ ECRT(1 : l)→CSTi(1 : l) (i = 1, 2, ... l). | ACCESS CONT |
|  | Transfer addresses of such CMS in CGi that MP instruction read out from each of them is to be shifted to RED read out cycle to PCSTi(1 : l). | ACCESS CONT |
| 42 | Transfer addresses of such CMs that MP instruction read out from each of them is to be shifted to REG read out cycle to TCST(1 : l), that is, $\bigvee_{i=1}^{l} PCSTi(1 : l) \rightarrow TCST(1 : l).$ | ACCESS CONT |
| 43 | Modify the address in CMi ( that is NATi(2a+1 : 2a+b)) by use of the execution result of the last MP instruction (= NATi(2a+b+1 : 2a+b+c)). | NAT CONT |
| 44 | Update ECRT(1 : l) by use of TCST(1 : l), that is ECRT(1 : l) ⊕ TCST(1 : l) → ECRT. ( ⊕ : exclusive OR) | ECRT CONT |
| 45 | (same with step 33) | NAT CONT |
| 46 | Select such ones of CM addresses stored in TCST(1 : l) that simultaneous REG read outs for A/B-operands of the MP instructions read out from them do not cause REG access conflict. | ACCESS CONT |
| 47 | Transfer address in A/B-REG stored in data register of CMi to address register of REGj by controlling SW-R, when i is contained in the addresses selected at Step 46 (i = 1, 2, ... l). | ACCESS CONT |
| 48 | Read out A/B-operand of MP instruction from REGj when REGj has been transferred address in REG at Step 47 (j = 1, 2, ... m). | REG group |
| 49 | Transfer A/B-operands read out at Step 48 to A/B input registers of ALUs by controlling SW-A/B. | ACCESS CONT |
| 50 | Transfer operation part of MP instruction stored in data register of CMi to ALUk by controlling SW-O, when i is contained in the address selected at Step 42 (i = 1, 2, ... l). | ACCESS CONT |

Table 3

| Step | Operations | CONT |
|---|---|---|
| 51 | Execute operation at ALU | ALU group |
| 52 | Select such ones of CM addresses store in TCST(1 : l) that simultaneous write for D-operands of the MP instructions read out from them do not cause REG access conflict. | ACCESS CONT |
| 53 | Transfer address in D-REG stored in data register of CMi to address register of REGj by controlling SW-R, when i is contained in the addresses selected at Step 52 (i = 1, 2, ... l). | ACCESS CONT |
|  | Transfer results of operations executed at Step 51 to write-data-registers of REGs by controlling SW-D. | ACCESS CONT |
| 54 | Write D-operands of MP instructions into REGj when REGj | ACCESS CONT |

Table 3-continued

| Step | Operations | CONT |
|---|---|---|
| | has been transferred address in REG and data at Step 53. | |
| 55 | Transfer test result at ALUj to NATi(2a+b+1 : 2a+b+c) by controlling SW-T, when TCST(i) = "1" (i = 1, 2, ... l). | ACCESS CONT |

The step 31 is to perform the initial setting of the apparatus. In OCGPTi (1:l), OCGPTi (l+1), OCGPTi (l+2) and OCGPTi (l+2+1:l+2+w), there are respectively retained in accordance with the setting, the addresses of all the CM's included in the CGi, the validity of the CGi, the operation mode of the CGi and the number of the ALU's to be allocated to the CGi. In the ICATi (1:a) and ICATi (a+b) there are respectively retained, in accordance with the setting, the CM address and address in the CM which is an execution start address of an MP written in the CMi. (Refer to FIG. 3A, No. 1 and No. 2.) In the step 31, CGPT CONT writes the content of the OCGPTi (1:l+2) in CGPTi (1:l+2) and NAT CONT writes the content of the ICATi (1:a+b) in NATi (a+1:2a+b). Further, ACCESS CONT reads therein the content of the OCGPTI (l+2+1:l+2+w), allocates to the CGi a corresponding number of ALU's indicated by the OCGPTI (l+2+1:l+2+w) and writes the addresses of the allocated ALU's in the CARCTj (a+b+c+d+1: a+b+c+d+e), where J in CARCTj is the address of CM included in the CGi.

Figure 5A:
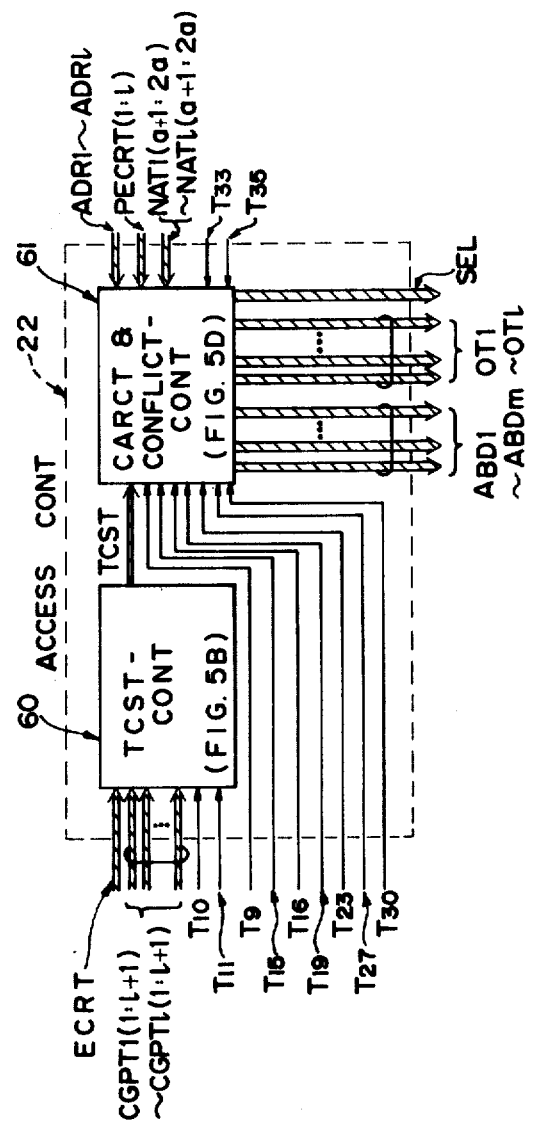
Figure 5B:
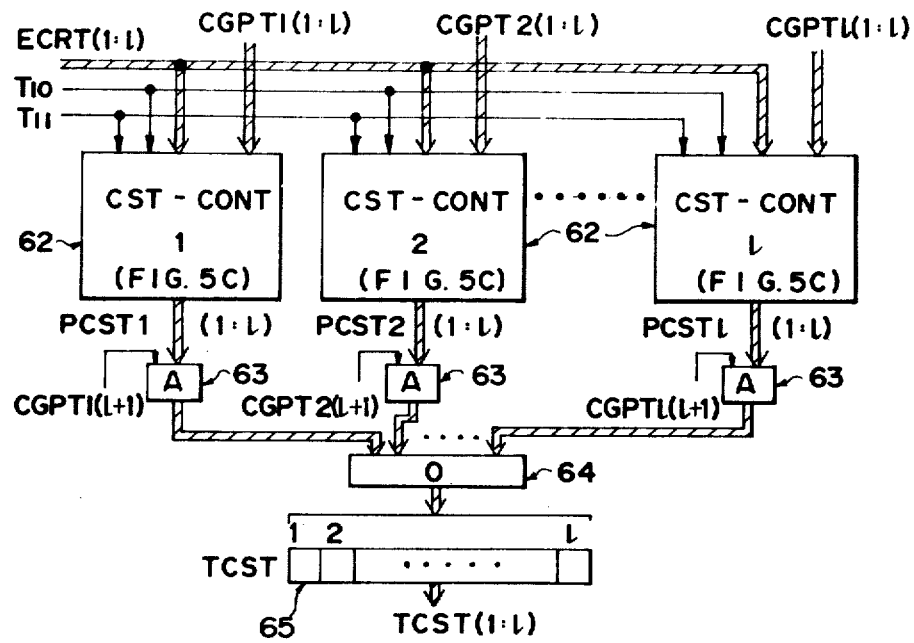
Figure 5C:
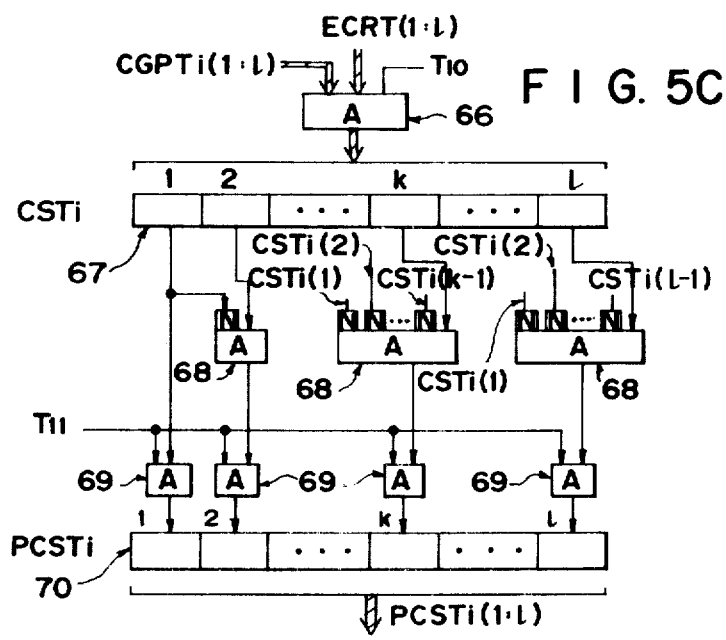
Figure 6B:
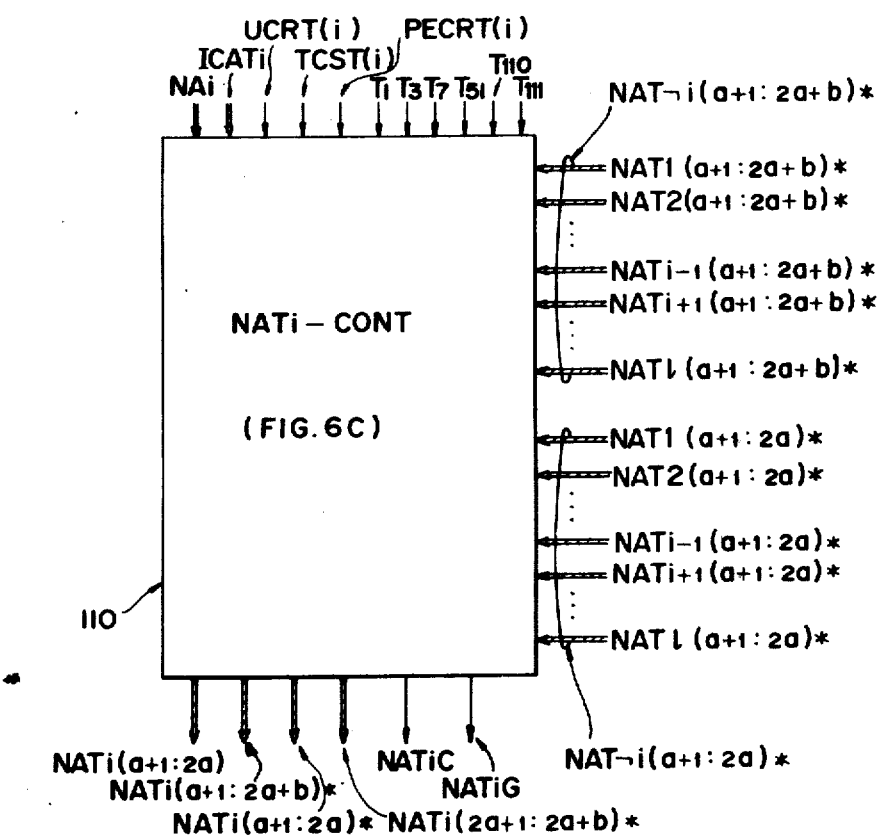
Figure 6C:
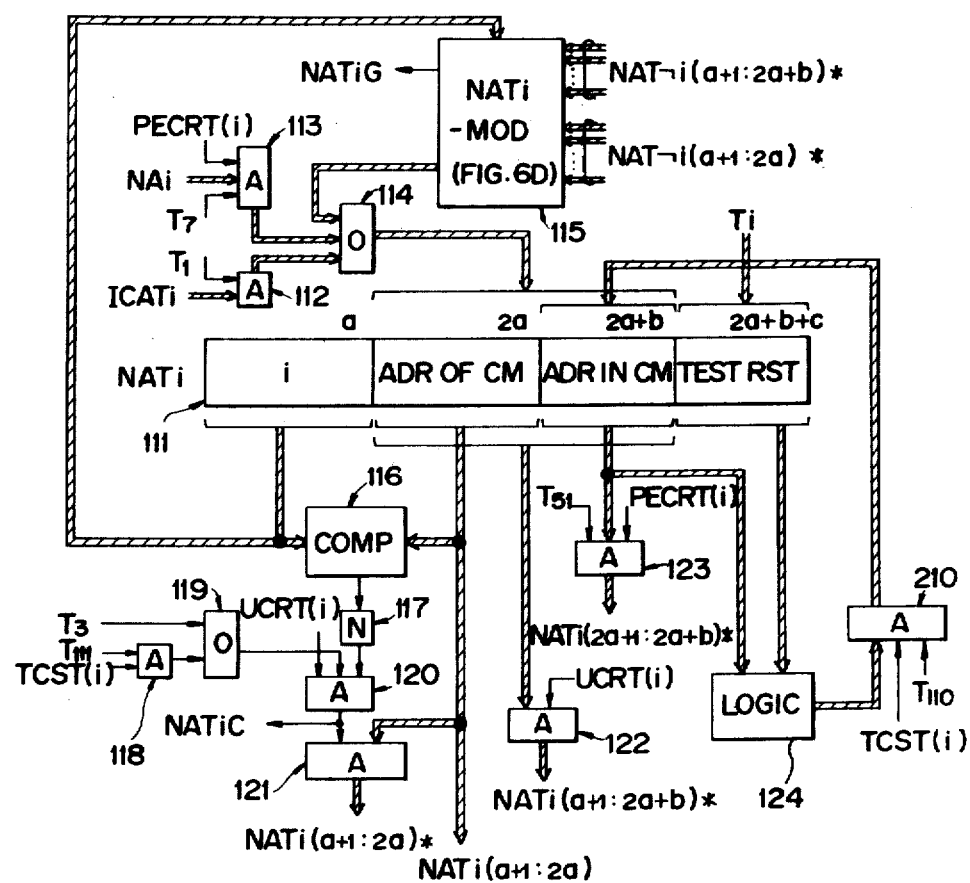
Figure 6E:
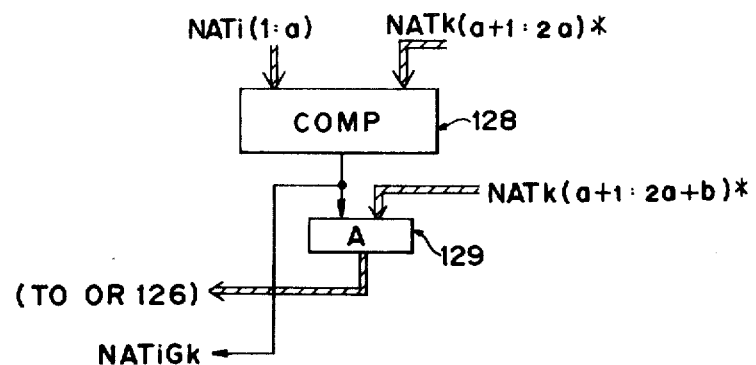
Figure 7A:
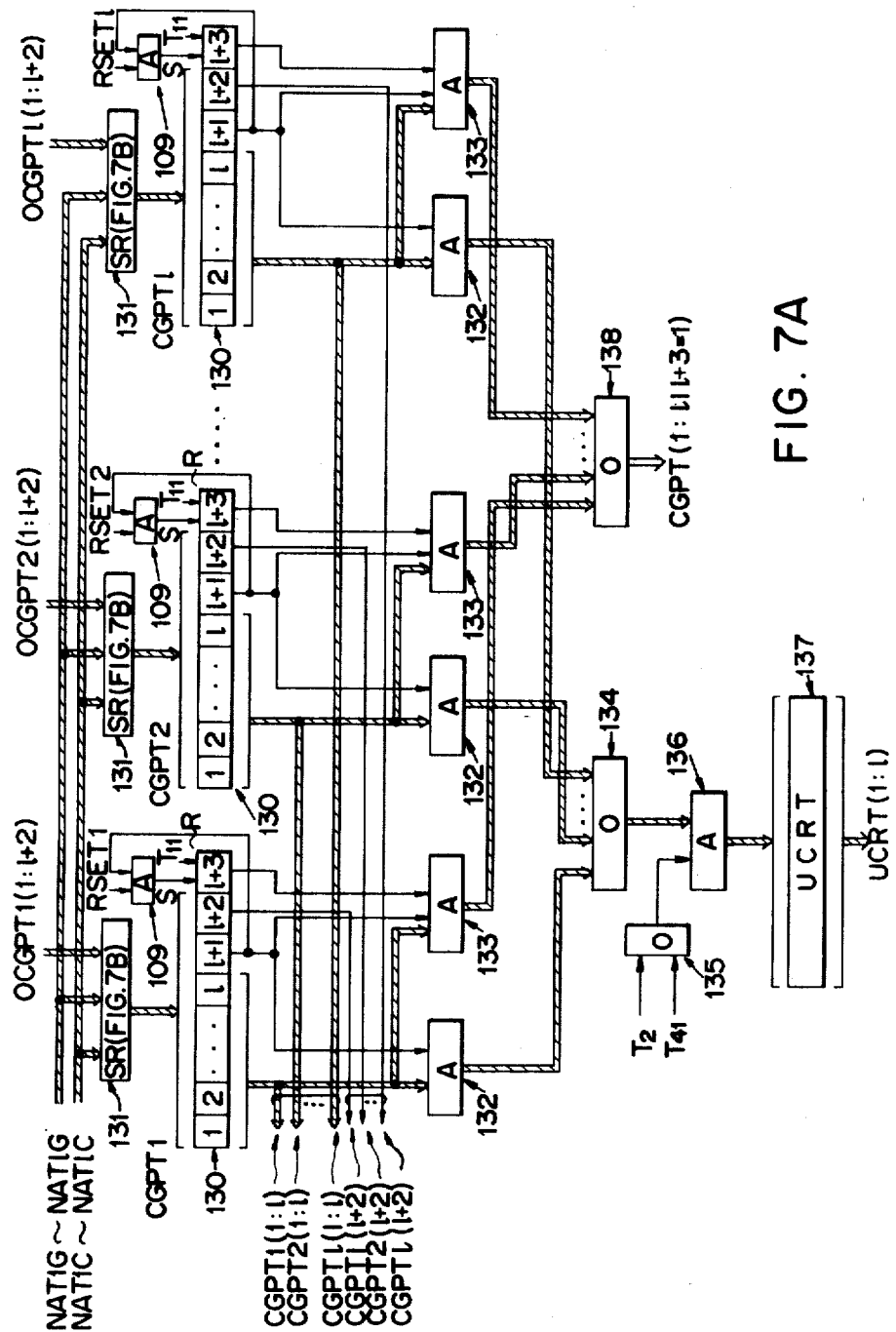
FIGS. 7A and 7B are block diagrams showing in detail the CGPT control circuit (CGPT CONT) of FIG. 2.
Figure 7B:
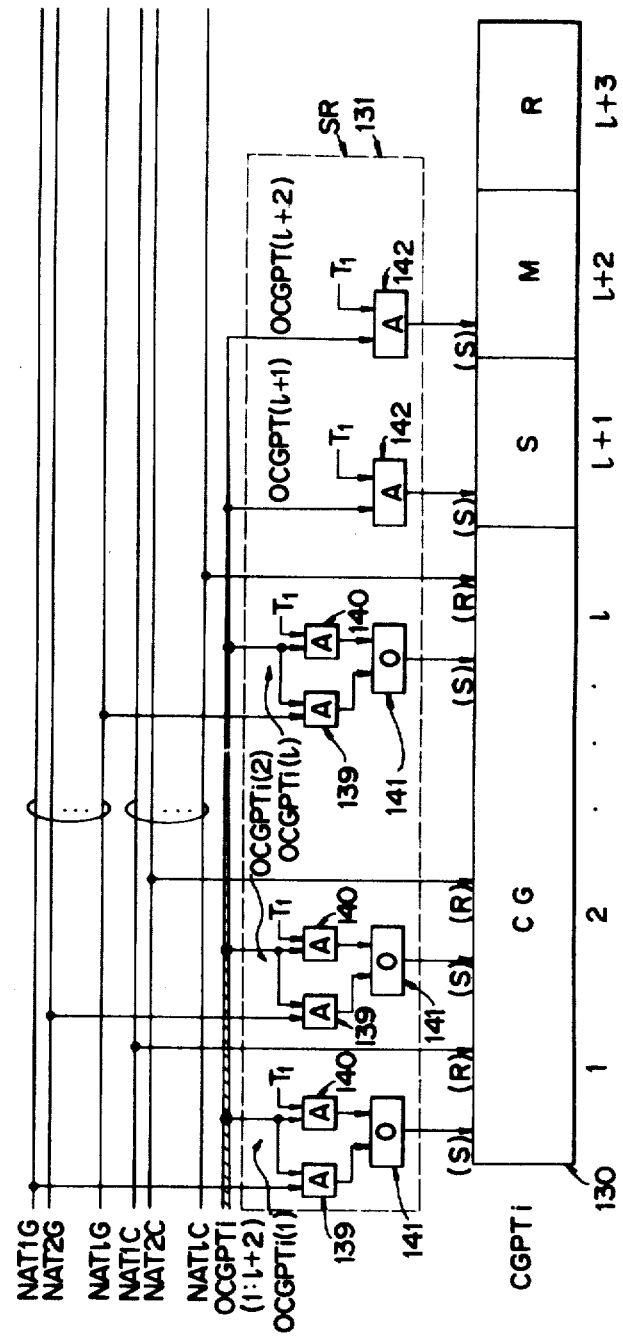
Figure 11:
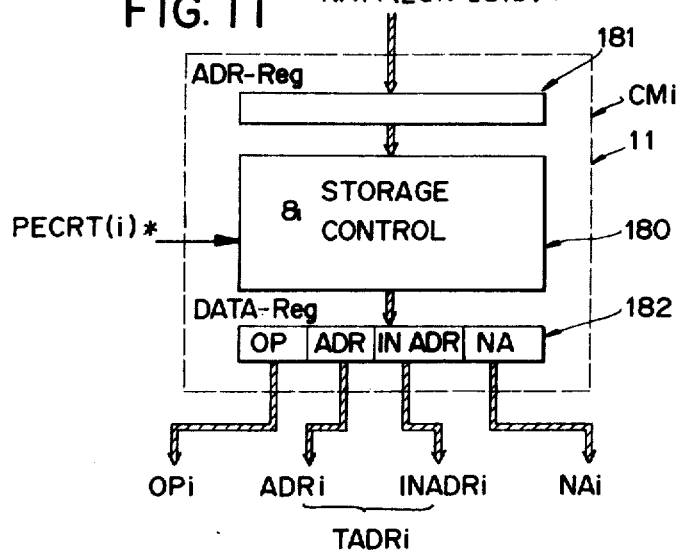
FIG. 11 is a block diagram showing in detail a control memory CM of FIG. 1.

That is, in CGPT CONT shown in FIGS. 7A and 7B, a set/reset circuit (SR) 131 of FIG. 7B passes OCGPTi (l) to OCGPTi (l) from EXEC CONT through AND circuits 140 at the timing $T_1$, setting them in bits 1 to l of a CGPTi register 130 through OR circuits 141. Further, the set/reset circuit (SR) 131 passes OCGPTi (l+1) and OCGPTi (l+2) similarly from the EXECT CONT through AND circuits 142 at the timing $T_1$, setting them in bits l+1 and l+2 of the CGPTi register 130. In NAT CONT shown in FIGS. 6A to 6E, NATi-CONT of FIG. 6C passes ICATi (1:l) from the EXECT CONT through an AND circuit 112 at the timing $T_1$, setting them in bits a+1 to 2a+b of an NATi register 111 through an OR circuit 114. In ACCESS CONT in FIGS. 5A to 5G, the addresses of ALU's which are to execute MP instructions read out from CMi are set in bits (a+b+c+d+1) to (a+b+c+d+e) of a CARCTi register 85 in FIG. 5E. In FIG. 5E, logic following the above explanation is not shown but a method of directly setting the ALU addresses in the above bit positions at the time of design of an exclusive I/O controller is shown. The logic following the above explanation can also be devised with ease but, for the sake of brevity, the simple method is used in this case.

In the step 32, all CM addresses contained in all valid CGi's, i.e. CGi's that CGPTi (l+1) = "1", are set in a UCRT register. That is, in CGPT CONT in FIG. 7A, the contents of bits 1 to l of all CGPTi's are passed through AND circuits 132 only when the bit l+1 = "1" (that is, only when CGi is valid) and outputs from the l AND circuits 132 are applied to an OR circuit 134, in which they are OR'd with one another in a bit-coordinate manner. The output from the OR circuit 134 is passed through an AND circuit 136 at the timing $T_2$ defined by the output from an OR circuit 135, and is set in bits 1 to l of a UCRT 137.

The step 33 is to perform an update operation for setting "1" in only one of bits of CGPTi corresponding to CM's included in a sub-CG belonging to a CGi, and setting "0" in the other bits. Now, let it be assumed that S CM's are included in the CGi and that S1 (S1≦S) CM's form the sub-CG. The microprogram written in this subCG has a high degree of serial property of its execution order as mentioned previously, and cannot be executed by parallel processing and, further, this microprogram has a relatively large number of steps, so that it is written in the S1 CM's. Accordingly, at a certain CM readout instant, it is necessary to read out an MP instruction from only one of the S1 CM's. An address for starting execution of the microprogram written in this sub-CG is as follows: If the addresses of the CM's included in the sub-CG are taken as $i_1, i_2, ... i_{S1}$, and if the sub-CG belongs to a CGi, since exactly the same contents are written in $ICATi_1, ICATi_2, ... ICATi_{S1}$, it is necessary that only one bit of CGPTi (1 : l) corresponding to the CM of the same address as the CM address indicated by bits 1 to a of $ICATi_t$ (t may be, any of 1, 2, ... S1) is set to "1" and that the other bits of the abovesaid CGPTi corresponding to the other remaining CM's included in the sub-CG are set to "0". Generally speaking, at a certain instant during readout of CM's, only one of bits of CGPT(1:l) corresponding to the CM included in each sub-CG is required to be "1". In the step 33, a set/reset operation therefor and a change in the content of NATi(a+1:2a+b) for producing set and reset signals are achieved. Namely, in NAT CONT shown in FIGS. 6A to 6E, NATi-CONT of FIG. 6C compares by a comparator (COMP) 116 the content (an address of CMi) of NATi(1:a) of a NATi register 111 with the content of NATi(a+1:2a) (which is the same as the content of ICATi(1:a) at the instant of the step 33. Generally, assuming that an MP instruction is read out from CMi in the last step, the abovesaid content indicates an address of CM having stored therein the MP instruction to be read out next.). When the output from the comparator 116 is "0" (when the abovesaid contents are not coincident with each other), the output is applied to an AND circuit 120 through a NOT circuit 117. In the case of UCRT(i) = "1" (This indicates that the MP instruction of the preceding step has been read out from CMi. At the instant of the step 33, UCRT(i) corresponding to each CMi contained in valid CG is set at "1" (in the step 32), so that UCRT(i)'s corresponding to CM's forming the sub-CG are also set at "1".), the AND circuit 120 passes therethrough the output from the NOT circuit 117 at the timing $T_3$ supplied through an OR circuit 119. When the output NATiC from the AND circuit 120 is "1", it indicates that the address of CM having stored therein the MP instruction to be read out in the next step is different from i. If CG including CMi is taken as CGj, the abovesaid output NATiC is used for resetting a bit i of CGPTj. (described later on). The output NATiC is connected to an AND circuit 121 and when NATiC is "1", the content of NATi (a+1:2a) is permitted to pass through the AND circuit 121. The output from the AND circuit 121 is a signal NATi(a+1:2a)*, which is supplied to a circuit NATk-MOD 115 (k≠i) for transferring the content of NATi(a+1:2a+b) to NATj(a+1:2a+b) of another NATj register whose address (that is j) is equal to the content of NATi(a+1:2a). (It must be noted here that the signal NATi(a+1-

:2a)* is not supplied to NATi-MOD included in NATi-CONT.) When UCRT(i) = "1", the content of NATi-(a+1:2a+b) passes through an AND circuit 122 to become a signal NATi(a+1:2a+b)*, which is applied to (l—1) NATk-MODs 115(k≠i) as is the case with the signal NATi(a+1:2a)*. In NATi-MOD shown in FIG. 6D, (l—1) pairs of signals NATk(a+1:2a)* and NATk-(a+1:2a+b)* transmitted from the other NATk-MODs 115 (k≠i) are respectively applied to (l—1) gate circuits $G_k$ (k≠i). In the gate circuit $G_k$ depicted in FIG. 6E, the contents of the signal NATi(1:a) supplied from the NATi register and the signal NATk (a+1:2a)* supplied from the NATk register are compared with each other in a comparator circuit (COMP) 128. In the case of coincidence, the signal NATk(a+1:2a+b)* is supplied through an AND circuit 129 to an OR circuit 126 shown in FIG. 6D, from which the signal is applied to NATi(a+1:2a+b) through an OR circuit 114 shown in FIG. 6C. As a result of this, the contents of NATi (1:a) and NATi(a+1:2a) are brought into coincidence with each other. Such coincidence is required because the content of NATi(2a+1:2a+b) (addresses in CM) is transferred to an address register of CMi later on. NATiC is always "0" with respect to CM's which are not included in the sub-CG, so that the NATi-MOD circuit 115 is unnecessary. In FIG. 6E, the output from the comparator circuit (COMP) 128 is a signal NATiGk and, in FIG. 6D, the (l—1) gate circuits Gk (k≠i) each supply a signal NATiGk through an OR circuit 127. When the signal NATiG is "1", it is used for setting a bit i of CGPTj, if CG including CMi is taken as CGj (described later). That is, when the signal NATiG is "1", it indicates that the content of NATk(a+1:2a+b) has been transferred from an NATk register (k≠i) to a register NATi(a+1:2a+b). Accordingly, this indicates that an MP instruction has been read out from CMk in the immediately preceding step and that an instruction is required to be read out from an address indicated by the content of the register NATi (2a+1:2a+b) in the next step. Therefore, it is necessary to set the bit i of CGPTj, if CG including CMi is taken as CGj.

In CGPT CONT shown in FIGS. 7A and 7B, an SR circuit 131 depicted in FIG. 7B fetches in the signals NAT1G to NATlG and NAT1C to NATlC supplied from NAT CONT as described above, and supplies a signal NATpG to an AND circuit 139 corresponding to a bit p of a CGPTi register 130. In the case of the content of the signal NATpG being "1", only when the content of OCGPTi(p) is "1" (indicating that CMp is included in CGi), CGPTi(p) is set at "1" through an OR circuit 141. Further, the signal NATpC is supplied to a reset terminal of the bit p of the CGPTi register 130, whereby CGPTi(p) is reset at "0" when the content of the signal NATpC is "1".

The step 34 is to determine the addresses of CM's to be read out in the current CM read cycle and, in this case, these addresses are determined for each CG. In this embodiment since CM's included in each CG are simultaneously read out in parallel (however, it is apparent that in the case of including the aforementioned sub-CG, one of the CM's included in the sub-CG is read out), the abovesaid operation is required. Whether or not the CM's included in CGi are to be read out in the current cycle, is controlled by the content of the bit l+3 of CGPTi. When the bit is "1", the CM's are read out in the current cycle and when the bit is "0", the readout of the CM's is not achieved. (Refer to FIG. 3A, No. 3). In Wait/Go-On CONT shown in FIG. 9, the contents of CGPT1(1:l) to CGPTl(1:l) supplied from CGPT CONT and the content of ECRT(1:l) supplied from ECRT CONT are ANDed with each other for each bit in AND circuits 160. (When the content of ECRT(i) is "1", it indicates that the MP instruction read out from CMi have not yet been executed, that is, REG access operations for reading out operands have not yet been started.) The l-bit outputs from the AND circuits 160 are each supplied to an OR circuit 161. When the output from the OR circuit 161 is "0", it indicates that the MP instructions read out from CM's included in CMi have already been shifted to the REG access operation (or executed). The output from each OR circuit 161 is supplied to AND circuits 163 and 164 through a NOT circuit 162. The AND circuit 163 is supplied with the content of CGPTi(l+2). (When this bit is "1", it indicates the Go-On and when "0", it indicates the Wait mode). When the output from the NOT circuit 162 is "1" and the content of CGPTi(l+2) is "1" (the Go-On mode), the output "1" from the AND circuit 163 is applied to an OR circuit 168, the output from which is passed through 169 at the timing $T_4$ to set a RSETi signal at "1". This signal "1" is used for setting CGPTi(l+3) at "1" (described later). Further, the AND circuit 164 is supplied with the content of CGPTi(l+2) through a NOT circuit and when the output from this NOT circuit is "1" and the output from the NOT circuit 162 is "1", the AND circuit 164 applies an output "1" to an OR circuit 165. The OR circuit 165 is supplied with the content of CGPTi(l+2), too, so that the OR circuit 165 produces an output "1" either in the case where CGi is in the Go-On mode or in the case where CGi is in the Wait mode and all the MP instructions read out from CM's included in CGi have been shifted to the REG read cycle. The output from the OR circuit 165 is supplied to an AND circuit 166 together with the outputs from the other (l—1) OR circuits 165. When the contents of these inputs to the AND circuit 166 are all "1", that is, when all the MP instructions read out from all CM's included in all CG's in the Wait mode have already been shifted to the REG read cycle, the AND circuit 166 supplies an output "1" to AND circuits 167. And only when the output from the AND circuit 164 is "1", the AND circuit 167 supplies an output "1" through the OR circuit 168 to the AND circuit 169 to set its RSETi output at "1" at the timing $T_4$.

In CGPT CONT shown in FIG. 7A, the RSETi signal is supplied to an AND circuit 109 corresponding to the bit l+3 of CGPTi, setting this bit at "1" when the content of CGPTi(l+1) is "1" (i.e. when CGi is valid).

In the step 35, exactly the same operations as those in the step 32 are achieved. Namely, in CGPT CONT of FIG. 7A, the OR circuit 135 is supplied with the timing signal $T_{41}$ (corresponding to that in this step 35) in addition to the timing signal $T_2$ (corresponding to that in step 32) to set the content of the UCRT register 137 in the same manner as in the step 32.

In the step 36, the addresses of CM's from which MP instructions are to be read out in the current cycle are determined. Further, the addresses of CM's having stored therein MP instructions which would have already been read out therefrom but have not yet been shifted to the REG read cycle are determined, assuming that read out operations for the above CM's have been already carried out. In this case, since the addresses of CM's to be read out in the current cycle have already been determined in the step 34, the result of this determination is utilized. Namely, in CGPT CONT of FIG. 7A, the contents of bits 1 to l of those CGPTi's of 1 CGPTi registers whose bits $l+1$ (validity bit) and $l+3$ are both "1", are outputted though AND circuits 133 and OR'd with one another for each bit in an OR circuit 138 to obtain an output CGPT(1:l/l+3 = 1), which is supplied to ECRT CONT. The content of this signal indicates the addresses of CM's from which MP instructions are to be read out in the current cycle. In ECRT CONT of FIG. 8, the content of the signal CGPT (1:l/l+3 = 1) supplied from CGPT CONT as described above and the content of the bits 1 to l of an ECRT register 150 are OR'd with each other for each bit in an OR circuit 157. The output from the OR circuit 157 is passed through an AND circuit 155 at the timing $T_5$ and applied to an OR circuit 154, the output from which is set again the bits 1 to l of the ECRT register 150. Further, the content of CGPTi(1:l/l+3 = 1) is passed through an AND circuit 152 at the timing $T_5$ and then set in bits 1 to l of a PECRT register 151.

In the step 37, bits $2a+1$ to $2a+b$ of the NAT i register of NATi-CONT (the address in CMi) are transferred to an address register of CMi that the content of PECRT(i) is "1", in preparation for readout of CM's in the current cycle. That is, in NATi-CONT of FIG. 6C, the contents of bits $2a+1$ to $2a+b$ of the NATi register 111 are passed through an AND circuit 123 at the timing $T_{51}$ only when the content of PECRT(i) is "1", and the output signal NATi($2a+1:2a+b$)* from the AND circuit 123 is supplied to CMi. In CMi shown in FIG. 11, the content of the signal NATi($2a+1:2a+b$)*is taken in to be set in an address register (ADR-Reg) 181.

Figures 13, 15:
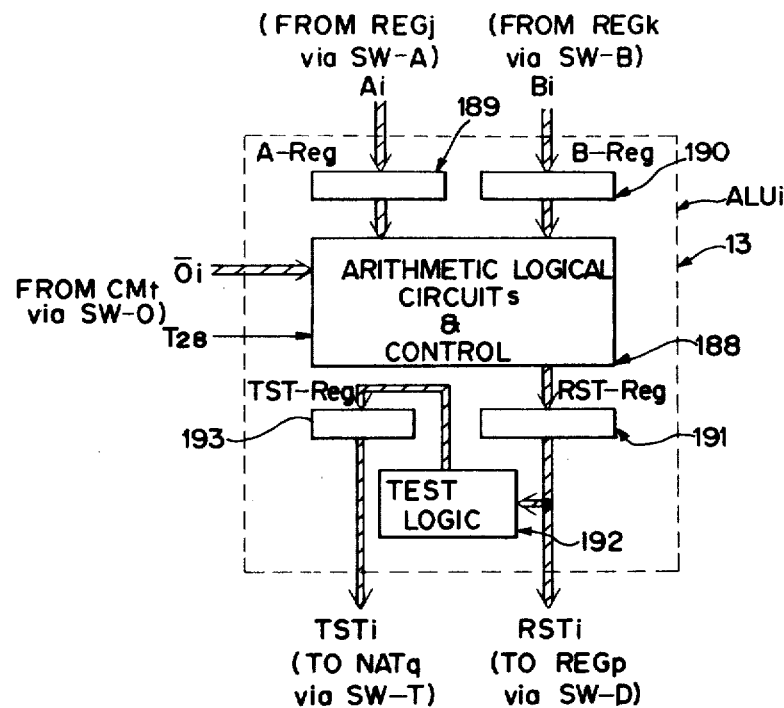
FIG. 13 is a block diagram showing in detail the arithemtic-logic unit ALU of FIG. 1.
FIG. 15 is an explanatory diagram showing one embodiment of the formation of an MP instruction stored in the CM's of FIG. 1.

In the step 38, MP instructions are read out from CMi that the content of PECRT(i) is "1". That is, in ECRT CONT of FIG. 8, the content of a PECRT register 151 is applied to an AND circuit 153 at the timing $T_6$ to obtain therefrom an output signal PECRT(1:l)*, which is supplied to CM1 to CMl. In the CMi 11 shown in FIG. 11, only when the content of the signal PECRT(i)* taken in is "1", MP instruction is read out based on the address transferred to the ADR-Reg 181 in the step 37 and, then set in a data register (DATE-Reg) 182. One example of the format of the MP instructions thus read out is shown in FIG. 15. The data register 182 provides a signal OPi indicating the kind of operation, a signal ADRi indicating the addresses of each of A-REG, B-REG and D-REG, a signal INADRi indicating the addresses in each of A-REG, B-REG and D-REG and a signal NAi indicating the addresses of and in CM having stored therein MP instruction of the next step. These signals are supplied to respective parts of apparatus.

In FIG. 4B, reference numeral 56 designates a synchronizing signal indicating it necessary to complete the operation of the step 55 of the immediately preceding cycle by the above instant.

In the step 39, next address portions (the addresses of CM and those in CM) in the MP instructions read out from CM's in the step 38 and set in the data registers of CM's, is set in bits $a+1$ to $2a+b$ of the NATi register of NAT CONT. That is, in CMi of FIG. 11, the next address portion of the read MP instruction is outputted as the signal NAi from the data register (DATA-Reg) 182 and supplied to NATi-CONT. In NATi-CONT of FIG. 6C, only when the content PECRT(i) is "1", the signal NAi supplied as described above is applied to an AND circuit 113 at the timing $T_7$ and the output from the AND circuit 113 is set in bits $a+1$ to $2a+b$ of the NATi register 111 through the OR circuit 114.

In the step 40, the addresses of registers REG which have stored therein operands A, B and D of the MP instructions read out and set in the data registers of the CM's in the step 38, that is, A-REG, B-REG and D-REG addresses, are respectively set in bits $a+1$ to $a+b$, $a+b+1$ to $a+b+d$ and $a+b+d+1$ to $a+b+d+d$ of the CARCTi register of ACCESS CONT. Namely, in the CMi of FIG. 11, the A-REG, B-REG and D-REG addresses of the read MP instruction are outputted (in a concatenated form) as the signal ADRi from the data register (DATA-Reg) 182 and supplied to ACCESS CONT. In ACCESS CONT depicted in FIGS. 5A to 5E, only when the content of PECRT(i) is "1", CARCT-CONTi 71 of FIG. 5E passes the signal ADRi through an AND circuit 84 at the timing $T_9$ and sets the signal in bits $a+1$ to $a+b+c+d$ of the CARCTi register 85.

Figure 8:
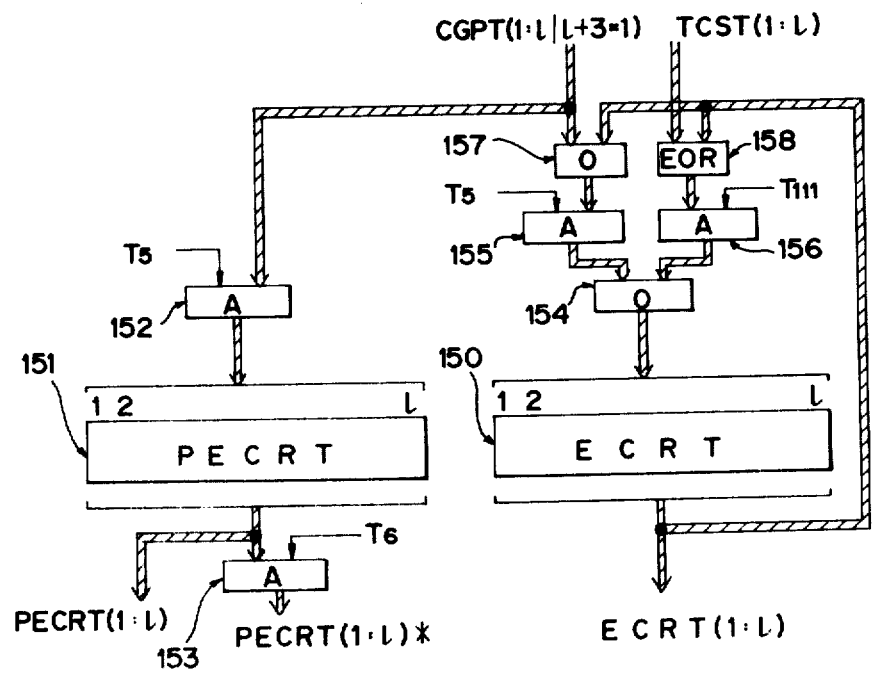
FIG. 8 is a block diagram showing in detail the ECRT control circuit (ECRT CONT) of FIG. 2.

In the step 41, the addresses of CM's having stored therein MP instructions which have already been read out therefrom but have not yet been shifted to the REG read cycle, are determined. These addresses are set in l CSTi registers in ACCESS CONT. The addresses of the CM's having stored therein the MP instructions which have already been read out but have not yet been shifted to the REG read cycle yet, are already set in the ECRT register of ECRT CONT in the step 36, so that the purpose in this step can be attained by dividing the content of the ECRT register corresponding to each CG. That is, CGPT CONT depicted in FIG. 7A outputs bits 1 to l and l+2 of a CGPTi register 130 and supplies them as signals CGPTi(1:l) and CGPTi(l+2) to ACCESS CONT. In FIG. 8, ECRT CONT outputs the content of the ECRT register 150 and supplies it as a signal ECRT(1:l) to ACCESS CONT. In ACCESS CONT shown in FIGS. 5A to 5G, CST-CONTi of FIG. 5C ANDs the contents of the signals CGPTi(1:l) and ECRT(1:l) with each other for each bit in an AND circuit 66 and sets its output in a CSTi register 67 at the timing $T_{10}$.

In the step 42, the addresses of CM's, in which the MP instructions to be shifted to the REG read cycle had been stored, are selected from the addresses of CM's having stored therein the MP instructions already read out corresponding to each CG but have not yet been shifted to the REG read cycle, which were obtained in the step 41, and these selected addresses are set in a PCSTi register of ACCESS CONT, corresponding to each CGi. Of these selected addresses of CM's corresponding to l CG's, the addresses of CM's corresponding to valid CG's are OR'd with each other, by which the addresses of all CM's having stored therein the MP instructions to be shifted to the REG read operation in the current cycle, are determined and set in a TCST register of ACCESS CONT. In the present embodiment, one ALU is assumed to be allocated to each CG, so that the addresses of CM's which had stored therein the MP instructions to be shifted to the REG read operation can be determined by selecting one of the addresses of CM's set in the abovesaid CSTi register in accordance with a certain algorithm. The present embodiment employs such an algorithm that the address of the lowest number is selected from the plurality of addresses set in the CSTi register. (Generally, in the case where t ALU's have been allocated to CGi consisting of s CM's($t \leq s$), for determining the addresses of CM's which had stored therein the MP instructions to be shifted to the REG read operation, it is sufficient to adopt such an algorithm that when the number of addresses set in the abovesaid CSTi register is larger than t, t lowest-number (or highest number) ones of the addresses are selected and that when the number of addresses set in the CSTi register is equal to or smaller than t, all the addresses are selected.) That is, in ACCESS CONT shown in FIGS. 5A to 5G, CST-CONTi of FIG. 5C supplies an AND circuit 68 with the output of a bit k of a CSTi register 67 and outputs from NOT circuits supplied with bits 1 to k−1 of the CSTi register 67. In the AND circuit 68, the k inputs are ANDed with one another to obtain an AND, which is supplied to an AND circuit 69. When the output from the AND circuit 68 is "1", the contents of bits 1 to k-1 of the CSTi register 67 are all "0" and only the content of the bit k of the CSTi register 67 is "1". In other words, only the output from the AND circuit 68 corresponding to the bit which corresponds to the lowest-number one of the addresses of CM's set in the CSTi register 67, is "1". Where the output from the AND circuit 68 is "1", the AND circuit 69 passes it therethrough at the timing $T_{11}$ to set the corresponding bit of a PCSTi register 10. In TCST-CONT shown in FIG. 5B, the content of the output PCSTi(1:l) of bits 1 to l of the PCSTi register 70 is applied to an AND circuit 63, which supplies an OR circuit 64 with the content of the signal PCSTi(1:l) only when the content of the signal CGPTi(l+1) supplied from CGPT CONT is "1" (when CGi is valid). In the OR circuit 64, these l inputs thereto are OR'd with one another for each bit and, by the resulting output, a TCST register 65 is set.

In FIG. 4B, reference numeral 57 indicates that two flows branched therefrom are executed by parallel processing thereafter.

In the step 43, the addresses in CM having stored therein MP instructions of the next step, which are already set in the bits 2a+1 to 2a+b of the NATi register, are modified based on special status (for example, 0, +, −, carry, etc.) of the results of execution of the MP instructions of the immediately preceding step, which have been already set in the bits 2a+b+1 to 2a+b+c of the NATi register of NAT CONT. Namely, in NAT CONT depicted in FIGS. 6A to 6E, NATi-CONT of FIG. 6C sets the contents of the bits 2a+1 to 2a+b and those of the bits 2a+b+1 to 2a+b+c of the NATi register 111 in an address modifying logic circuit (LOGIC) 124 and modifies the former with the latter and supplies the result of this modification to an AND circuit 210. Only when the content of the signal TCST(i) is "1", the AND circuit 210 permits the passage therethrough of the output from the LOGIC 124 to be set in the bits 2a+1 to 2a+b of the NATi register 111.

In the step 44, the addresses of CM's, in which are stored therein the MP instructions which would have already been read out therefrom but would not have been shifted to the REG read operation when the MP instructions read out from CM's set in TCST(1:l) are assumed to be shifted to the REG read operation, are determined by using the content of TCST(i) and the determined addresses are set in the ECRT register. That is, in ECRT CONT of FIG. 8, an exclusive OR circuit 158 XORs(exclusive OR) the content of TCST(1:l) supplied from ACCESS CONT and the content of the ECRT register 150 for each bit, and supplies the resulting output to an AND circuit 156. The AND circuit 156 passes therethrough the input at the timing $T_{111}$ to apply it to the OR circuit 154 and, by the output therefrom, the bits 1 to l of the ECRT register 150 are set.

In the step 45, the same operation as that in the step 33 is performed. That is, in connection with sub-CG, in the case where the address i of CM from which the MP instructions of the current step have been read out and the address j of CM from which the MP instructions of the next step should be read out, are different from each other, if CG to which the sub-CG belongs is taken as CGk, the bit i of CGPTk is reset and the bit j is set. In other words, in NAT CONT shown in FIGS. 6A to 6E, NATi-CONT of FIG. 6C supplies the timing signal $T_3$ (a signal for starting the operation of the step 33) to the OR circuit 119 and, at the same time, supplies thereto the output from an AND circuit 118, too. Only when the content of TCST(i) is "1", the AND circuit 118 produces an output "1" at the timing $T_{111}$ to instruct the start of the same operation as that in the step 33. After completion of the step 45, the operation is returned to the step 34 and the operation of the next cycle is started.

In the step 46, in the event that, for reading out from REG's operands A and B of the MP instructions (the addresses of CM's in which they were stored are set in the TCST register) to be shifted to the REG read operation in the current cycle and for transferring the operands A and B to A-REG and B-REG of ALU's, REG's are accessed simultaneously for all of the abovesaid MP instructions, there is the possiblity of an access conflict occurring in a certain REG or REG's. To avoid such an excess conflict, the above plurality of accesses are divided into a plurality of groups and the accesses of each group are achieved simultaneously but accesses of different groups are achieved in a serial manner. In the step 46, such a dividing operation is performed. The dividing method is dependent upon allowable values of the number of simultaneous accesses causing an access conflict and the time necessary for removing the access conflict and completing all the accesses. In the present embodiment, the abovesaid allowable value of simultaneous accesses is 2 in both cases of the operand A and the operand B and the access for the operand A is followed by the access for the operand B. That is, the access for the operand A is divided into first and second groups and the access for the operand B is similarly divided into first and second groups. And an access-transfer operation is repeated four times in the following order: (1) access execution of the first group for the operand A, (2) transfer of the read-out content to A-REG's of ALU's, (3) access execution of the second group for the operand A, (4) transfer of the read-out content to A-REG's of ALU's, (5) access execution of the first group for the operand B, (6) transfer of the read-out content to B-REG's of ALU's, (7) access execution of the second group for the operand B and (8) transfer of the read-out content to B-REG's of ALU's. That is, in ACCESS CONT shown in FIGS. 5A to 5G, CARCT-CONTi of FIG. 5E outputs the contents of the bits a+1 to a+b (REG address of the operand A) and the contents of the bits a+b+1 to a+b+c (REG address of the operand B) as signals Ai and Bi, respectively. In CARCT & CONFLICT-CONT of FIG. 5D, the abovesaid signals Ai and Bi from CARCT-CONTi are respectively supplied to AND circuits 72 and 73 and then supplied to an OR circuit 75 at the timings $T_{12}$ and $T_{20}$, respectively. The OR circuit 75 supplies its output signal CARCTi(X:Y) to a COMP LOG circuit 76. In COMP LOG of FIG. 5F, the abovesaid l output signals CARCT1(X:Y) to CARCTl(X:Y) are supplied to COMP's circuits 98. COMP's shown in FIG. 5G are comprised of $(l-1)+(l-2)+\ldots+1 = l(l-1)/2$ comparator circuits (COMP) 105 and the same number of AND circuits 106 as the comparator circuits 105 for obtaining an output $a_{ij}$ ($i>j$; $i = 1, 2, \ldots, l-1$; $j = 2, 3, \ldots l$). The comparator circuit (COMP) 105 compares the contents of input signals CARCTi(X:Y) and CARCTj(X:Y) with each other, and outputs "1" when the both signals are coincident with each other. This output is supplied to the AND circuit 106, by which the output signal $a_{ij}$ is made "1" when the contents of TCST(i) and TCST(j) are both "1". In COMP LOG of FIG. 5F, only those of $l(l-1)/2$ output signals $a_{ij}$ ($i>j$; $i = 1, 2, \ldots l-1$; $j = 2, 3, \ldots l$) from COMP's 98 whose suffix i have the same value, are supplied to an OR circuit 99 together. When the output signal $a_{ij}$ is "1", it indicates that the MP instructions to be shifted to the REG access in the current cycle includes two MP instructions read out from CM's whose addresses are i and j, and that the REG addresses storing the operand A of the two instructions (the case where a signal Ai is supplied to the OR circuit 75 through the AND circuit 72 at the timing $T_{12}$ in FIG. 5D) are equal to each other or that the REG addresses storing the operand B of the two instructions (the case where the signal Bi is supplied to the OR circuit 75 through the AND circuit 73 at the timing $T_{20}$ in FIG. 5D) are equal to each other. As described above, the number of conflicting accesses in the A/B operand accessing is assumed to be only two, so that in the case the signal $a_{ij}$ being "1", the contents of signal groups $a_{ii+1}, a_{ii+2}, \ldots a_{ij-1}, a_{ij+1}, \ldots a_{il}$ supplied to the OR circuit 99 of FIG. 5F in combination with the signal $a_{ij}$ do not become "1". Accordingly, the fact that the output from the OR circuit 99 corresponding to the signal $(a_{ii+1}, a_{ii+2}, \ldots a_{il})$ is "1", implies that an MP instruction ($\mu$Ix) stored in CMi and to be shifted to the REG access in the current cycle exists, and that only one MP instruction having the same A operand address (or B operand address) as the abovesaid MP instruction $\mu$Ix exists in the MP instruction group to be shifted to the REG access in the current cycle. The output from the OR circuit 99 corresponding to each of the signal groups $(a_{ii+1}, a_{ii+2}, \ldots a_{il})$ is set in a bit i of a register $R_1$ 103 through an AND circuit 100 corresponding to the abovesaid bit i at the timing $T_{12}$ (during elimination of the A operand access conflict) or $T_{20}$ (during elimination of the B operand access conflict) generated through an OR circuit 102. All the MP instructions read out from CMi that the current of the bit i of the register $R_1$ 103 is "1", are those of the first group which are capable of simultaneously executing the A operand access without causing any access conflict. (If the content of $R_1(i)$ is "1", the content of the signal $a_{ij}$ is "1" with respect to only one $j(j\neq i)$ as mentioned above but the contents of $a_{jk}$ ($k = j+1, j+2, \ldots l$) corresponding to j are all "0". The reason is that if the content of $a_{jk}$ is "1" with respect to a certain $k(k\neq j)$, the MP instructions read out from (CMi, CMj and CMk) are all included in the instruction group to be shifted to the REG access operation and that their operands A (or operands B) will have the same REG address. This is contradictory to the assumption that such a result would not occur.)

The output from the OR circuit 99 corresponding to each of the signal groups $(a_{ii+1}, a_{ii+2}, \ldots a_{il})$ is also supplied through a NOT circuit to an AND circuit 101 corresponding to the bit i of a $R_2$ register 104. Only when the content of TCST(i) is "1", the AND circuit 101 passes therethrough the output from the OR circuit 99 to set it in the bit i of the register $R_2$ 104 at the timing $T_{12}$ or $T_{20}$ applied through the OR circuit 102. All the MP instructions read out from CMi indicating that the content of the bit i of the register $R_2$ 104 is "1", are those of the second group which are capable of simultaneously executing the A operand access (or B operand access) without any acess conflicting. (The reason is that only the presence of a pair of MP instructions ($\mu I_{i1}, \mu I_{i2}$) (i1, i2, i=1, 2, ...) causing an access conflict, a bit i1 (i=1, 2, ...) corresponding to a lower-numbered one (CMi1) of the control memories (CMi1, CMi2) (i=1, 2, ...), from which the abovesaid MP instructions are read out, is set at "1" in the register $R_1$ 103, so that one of the two MP instructions causing the access conflict is always included in the first group. Consequently, MP instructions of the second group do not cause an access conflict. In connection with bits l of the registers $R_1$ 103 and $R_2$ 104, setting conditions are different from the abovesaid. That is, the bit l of the register $R_1$ 103 is always set at "0" by an OR circuit 107 and an AND circuit 108. The bit l of the register $R_2$ 104 is set at "1" by the AND circuit 101 corresponding thereto at the timing $T_{12}$ or $T_{20}$ applied through the OR circuit 102 only when the content of TCST(l) is "1".

Figure 5D:
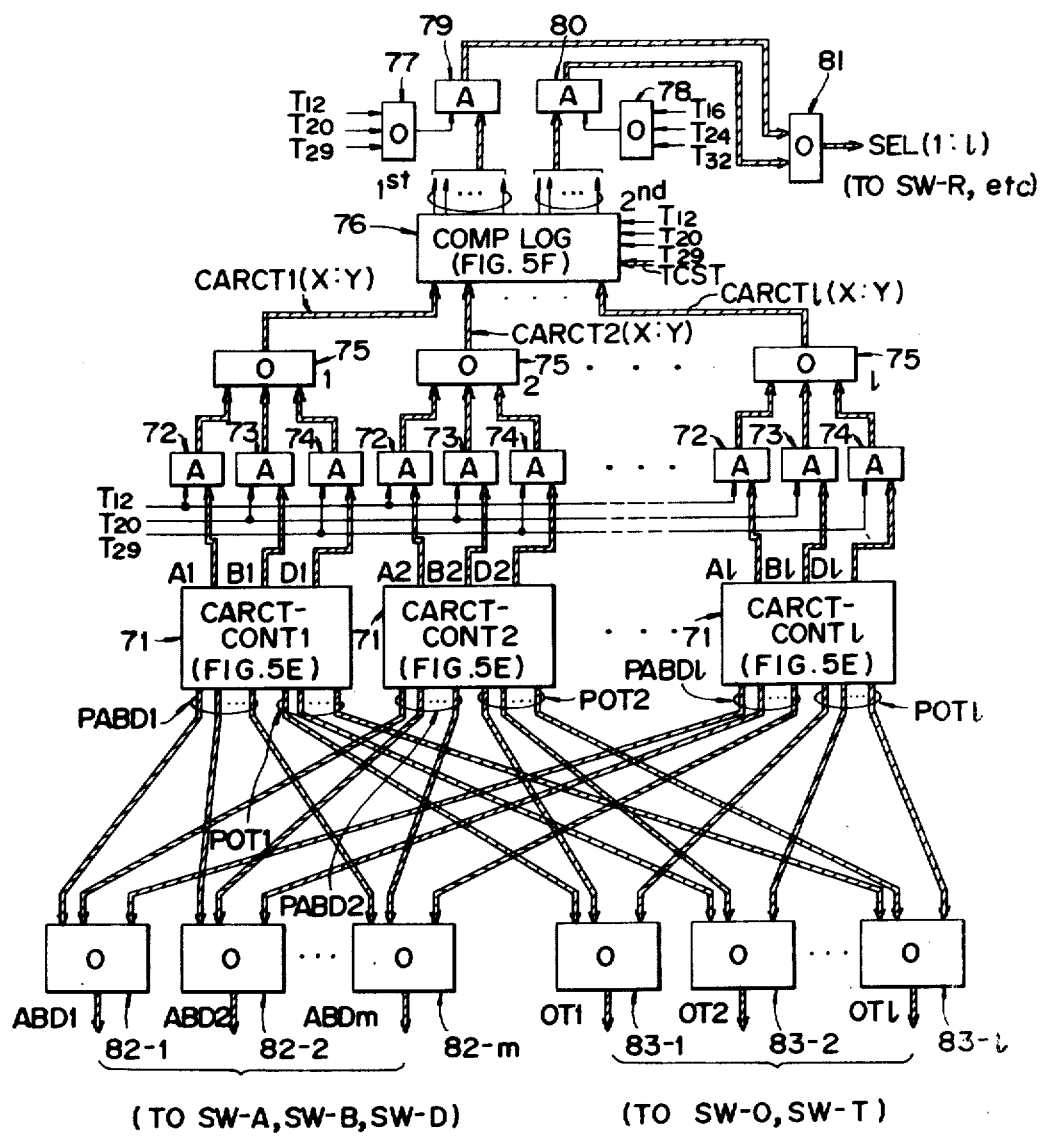

In CARCT & CONFLICT-CONT of FIG. 5D, first and second outputs from COMP LOG 76 are respectively supplied to AND circuits 79 and 80. The AND circuit 79 produces an output at the timing $T_{12}$ (the first group of A operand access) or $T_{20}$ (the first group of B operand access) supplied through an OR circuit 77 and supplies the output to an OR circuit 81. The OR circuit 80 supplies its output to the OR circuit 81 at the timing $T_{16}$ (the second group of A operand access) or $T_{24}$ (the second group of B operand access) supplied through an OR circuit 78. The OR circuit 81 supplies its output SEL(1:l) to the switch SW-R and CARCT-CONTi of FIG. 5E, etc.

In the step 47, the switch SW-R is controlled so that in accordance with the grouping (first A-REG access group, second A-REG access group, first B-REG access group or second B-REG access group) for the REG read operation determined in the step 46, the addresses in A-REG or B-REG retained in the data registers of CM's included in the group are set in the address registers of REG's indicated by the A-REG or B-REG addresses retained in the abovesaid data registers. That is, in the CMi 11 shown in FIG. 11, the contents of A-REG, B-REG and D-REG addresses retained in a DATA-Reg 182 are outputted together as one signal ADRi from the DATA-Reg 182. Further, the contents of the addresses in A-REG, B-REG and D-REG are similarly outputted together in the form of a signal INADRi from the DATA-Reg 182. A signal TADRi composed of the signals ADRi and INADRi the supplied to the switch SW-R.

Figure 14A:
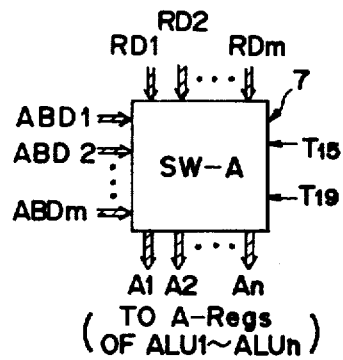
FIGS. 14A to 14F is a block diagram showing in detail switches SW-A, SW-B, SW-D, SW-R, SW-O and SW-T of FIG. 1.
Figure 14B:
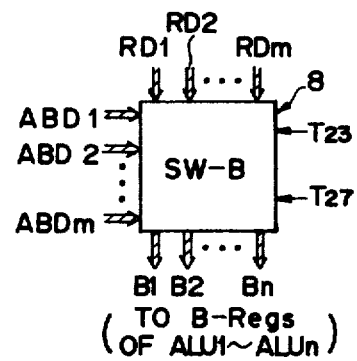
Figure 14C:
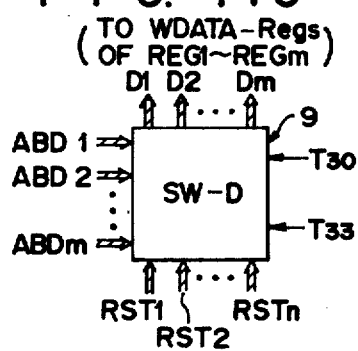
Figure 14D:
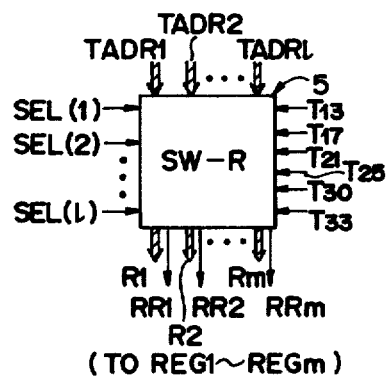

In FIG. 14D, a switch SW-R 5 is supplied with the abovesaid signals TADR1 to TADRl and SEl(1:l). When the content of the signal SEL(i) is "1", the switch SW-R 5 applies that portion of the content of the signal INADRi corresponding to the address in A-REG (in the case of the timing $T_{13}$ or $T_{17}$) or in B-REG (in the case of the timing $T_{21}$ or $T_{25}$) to an output line Rk of the same manner as a REG address k indicated by an A-REG part (in the case of the timing $T_{13}$ or $T_{17}$) or B-REG part (in the case of the timing $T_{21}$ or $T_{25}$) in the content of the signal ADRi which is one part of the signal TADRi, at the timing $T_{13}$ (in the case of the first A-REG group), $T_{17}$ (in the case of the second A-REG group), $T_{21}$ (in the case of the first B-REG group) or $T_{25}$ (in the case of the second B-REG group). At the same time, the switch SW-R 5 sets the content of an output line PRK at "1". Output lines (Rl, RR1) to (Rm, RRm) from the switch SW-R 5 are connected to REG1 to REGm, respectively.

Figure 12:
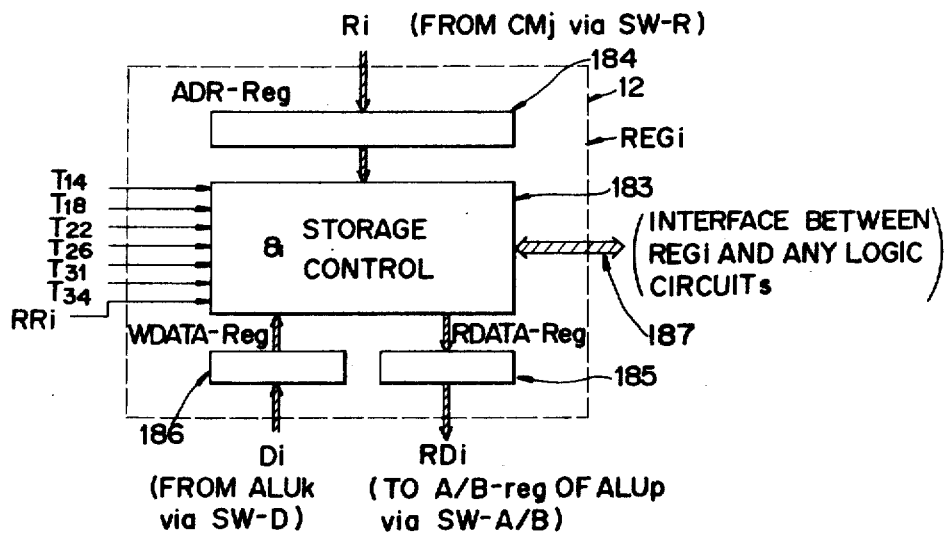
FIG. 12 is a block diagram showing in detail a register of group REG of FIG. 1.

In FIG. 12, a REGi 12 has connected thereto the abovesaid signal line Ri and sets its content in an ADR-Reg 184.

In the step 48, data (operands) are read out from REG's having set therein the addresses in REG in accordance with the addresses set therein.

Namely, in FIG. 12, only when the content of the signal RRi supplied from the switch SW-R is "1", a REGi 12 reads data of the address indicated by the content of an ADR-Reg 184 and sets it in an RDATA-Reg 185 at the timing $T_{14}$ (in the case of the first A-REG group), $T_{18}$ (in the case of the second A-REG group), $T_{22}$ (in the case of the first B-REG group) or $T_{26}$ (in the case of the second B-REG group). The RDATA-Reg 185 outputs its content as a signal RDi and supplies it to the switches SW-A and SW-B.

In the step 49, the data read out in the step 48 is set in an A input register or B input register of ALU by controlling the switches SW-A or SW-B.

That is, in ACCESS CONT shown in FIGS. 5A to 5G, CARCT-CONT of FIG. 5E supplies the contents of the bits $a+1$ to $a+b$ and $a+b+1$ to $a+b+c$ of the CARCT register 85 to AND circuits 90 and 91, respectively. Only when the content of the signal SEL(i) is "1", the AND circuit 90 supplies the content of CARCTi(a+1:a+b) to an OR circuit 93 at timing $T_{15}$ (in the case of a data transfer of the first A-REG group to ALU) or $T_{19}$ (in the case of a data transfer of the second A-REG group to ALU) supplied through an OR circuit 86. Further, only when the content of the signal SEL(i), is "1", the AND circuit 91 supplies the content of CARCTi(a+b+1:a+b+c) to the OR circuit 93 at the timing $T_{23}$ (in the case of a data transfer of the first B-REG group to ALU) or $T_{27}$ (a data transfer o the second B-REG group to ALU) supplied through an OR circuit 87. The content of the OR circuit 93 is supplied to a decoder circuit DEC 95 and decoded therein to provide outputs 1 to m. The output i becomes "1" when the REG address indicative of the content of the input to the DEC 95 indicates REGi. The outputs 1 to m from the DEC 95 are supplied to AND circuits 97 respectively corresponding thereto. Each of the AND circuit 97 is supplied with the contents of the bits $a+b+c+d+1$ to $a+b+c+d+e$ of the CARCTi register 85 (the addresses of ALU for executing the MP instructions read out from CMi) and these contents pass through the AND circuit 97 only when the content of the input thereto supplied from the DEC 95 is "1". The AND circuit 97, supplied with the output j from the DEC 95, supplies its output signal PABDij to an OR circuit 82-j in FIG. 5D. The OR circuit 82-j is supplied with similar l signals PABD1j to PABDlj, which are OR'd with one another for each bit, and the resulting output ABDj is supplied to the switches SW-A, SW-B and SW-D.

The content of the output ABDj, in the case of all bits being not "0", indicates the address of ALU to which the content of RDATA-Reg of REGj is to be transferred. The reason is that the number of m outputs from DEC 95 of FIG. 5E whose content is "1" is one at largest. When CMi is not selected by the signal SEL(i), m outputs are all "0". Accordingly, the content of PABDij that all the bits are not "0" with respect to one j, indicates the address of ALU (the address of ALU assigned to CMi) to which the content of RDATA-Reg of REGj is to be transferred. In FIG. 5D, the AND circuit 82-j is supplied with such l inputs PABD1j to PABDlj; but since the bit i of the signal SEL(1:) is set at "1" with respect to i which will not cause an access conflict in REG, all the bits of the largest one of the inputs PABD1j to PABDlj are not "0" and the bits of the other remaining (l−1) inputs are all "0". The reason is as follows: - Assuming that, of the above said inputs PABD1j to PABDlj, two (usually plural) inputs $PABD_{pj}$ and $PABD_{qj}$ ($1 \leq p, q \leq l, p \neq q$) are "0" in all bits, the A/B/D-REG addresses of two MP instructions, each read out of $CM_p$ and $CM_q$, both designate $REG_j$, and SEL(p) = SEL(q) = "1". This is inconsistent with the setting of each bit content of the above said SEL(1:l) so as to prevent an access conflict. Consequently, the content of the input PABDj whose all bits are not "0", indicates the address of ALU to which the content of RDATA-Reg of REGj should be transferred. For the same reason, when the content of ABDj is that all the bits are "0", it indicates that the content of RDATA-Reg of REGj need not be transferred to ALU.

Next, in FIG. 14A, the switch SW-A 7 fetches in the contents of signals RD1 to RDm supplied from RDATA-Regs of REG1 to REGm and the contents of the abovesaid signals ABD1 to ABDm. And, only with respect to the signal ABDi that all the bits are not "0", the switch SW-A 7 outputs the content of the signal RDi to an output line Ak of the same number as an address k indicated by the content of the signal ABDi, at the timing $T_{15}$ (in the case of a transfer of data of the first A-REG group to ALU) or $T_{19}$ (in the case of a transfer of data of the second A-REG group). Output lines A1 to An are respectively connected to A-Reg's of ALU1 to ALUn.

Similarly, in FIG. 14B, the switch SW-B 8 fetches in the contents of the signals RD1 to ABDm. And, only with respect to the signal ABDi that all the bits are not "0", the switch SW-B 8 outputs the content of the signal RDi to an output line Bk of the same number as the address k indicated by the content of the signal ABDi, at the timing $T_{23}$ (in the case of a transfer of data of the first B-REG group to ALU) or $T_{27}$ (in the case of a transfer of data of the second B-REG group). Output lines B1 to Bn are respectively connected to B-Reg's of ALU1 to ALUn.

Next, in FIG. 13, an ALUi 13 fetches in the contents of the signals Ai and Bi supplied from the switches SW-A and SW-B and sets them in A-Reg 189 and B-Reg 190.

In FIG. 4, the deciding operation of the step 58 is to check whether or not all the A/B operands of all the MP instructions shifted to the REG read operation in the current cycle have been transferred to ALU (the data transfer of the first and second A-REG groups and the first and second B-REG groups to ALU) in the steps 46 to 49. If all the operands have not been transferred yet, the operation is returned to the step 46 and the operations of the steps 46 to 49 are repeated again. If all the operands have been transferred, the step 50 is initiated. Accordingly, the steps 46 to 49 are repeated four times and then the operation proceeds to the step 50. In the present embodiment; however, the repetition of these steps is controlled by timing as described above, so that there is no circuit which executes the operation of the step 58 as it is.

In the step 50, the operation parts of the MP instructions shifted on the REG read operation in the current cycle (the operation parts being stored in the data register of CM from which the MP instructions have been read out) are transferred to suitable ALU by controlling the switch SW-O.

That is, in ACCESS CONT depicted in FIGS. 5A to 5G, CART-CONTi of FIG. 5E supplies the contents of the bits 1 to a of the CARCTi register 85 (the address of CMi) to an AND circuit 206. Only when the content of TCST(i) is "1", the AND circuit 206 applies its output to a decoder circuit (DEC) 94 through an OR circuit 207 at the timing $T_{16}$. The DEC 94 sets at "1" the content of that one of its l output lines which has a number corresponding to an input address, that is, only an output line i (equal to i of CARCTi). (However, when the content of TCST(i) is "0", all the bits of the input to the DEC 94 are "0", so that the contents of the l output lines of the DEC 94 are all "0".) The l output lines of the DEC 94 are each connected to an AND circuit 96. The AND circuit 96 is supplied with the contents of the bits $a+b+c+d+1$ to $a+b+c+d+e$ of the CARCTi register 85 (the address of ALU assigned to CMi). Only when the input from the DEC 94 is "1", the AND circuit 96 outputs the abovesaid ALU address. Namely, in output signals POTi1 to POTil from the l AND circuits 96, when the content of TCST(i) is "1", the content of the signal POTii indicates the address of ALU assigned to CMi and bits of all the other remaining $(l-1)$ signals POTij($j\neq i$) are all "0". When the content of TCST(i) is "0", bits of each of the l signals POTij are all "0".

In CARCT & CONFLICT-CONT shown in FIG. 5D, an OR circuit 83-j is supplied with the contents of the signals POT1j to POTlj from CARCT-CONT1 to CARCT-CONTl. In the OR circuit 83-j, the l input contents are OR'd with one another for each bit to produce an output signal OTj. Consequently, the content of the output signal OTj indicates the address of ALU allocated to CMi at the timing $T_{16}$ only when the content of TCST(j) is "1". In the other cases, all bits are "0". The output signals OT1 to OTl are supplied to the switch SW-O.

Figure 14E:
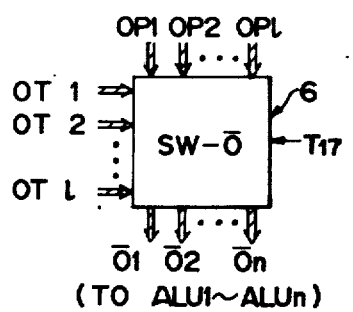

In FIG. 14E, the switch SW-O 6 fetches in the contents of the abovesaid signals OT1 to OTl and the contents of the signals lines OP1 to OPl supplied from the data registers of CM's (the operation parts of MP instructions), and outputs the content of the signal OPi corresponding to the signal OTi that all bits are not "0" to an output line Ok corresponding to an address k indicated by the content of the signal OTi (the address of ALU allocated to CMi), at the timing $T_{17}$. Output lines O1 to On are respectively connected to ALU1 to ALUn.

The operation of this step may be performed after the step 49 as shown in FIGS. 4A, 4B and 4C. Theoretically, it is desirable to complete the operation after the data transfer of the first A-REG group to ALU (at the timing $T_{15}$) in the step 49 but before the data transfer of the second B-REG group (at the timing $T_{27}$) in the step 49. Accordingly, in the present embodiment, the operation of this step is achieved at the timings $T_{16}$ and $T_{17}$. In FIGS. 4A, 4B and 4C, this step is placed after the step 49 merely because it was difficult to draw such parallel operation in the form of a flow chart.

In the step 51, in n ALU's of the ALU group, MP instructions are executed simultaneously.

That is, in FIG. 13, the ALUi 13 processes at the timing $t_{28}$ the contents of the A-Reg 189 and B-Reg 190 already set therein in accordance with the content of the operation part of the MP instruction supplied through the switch SW-O. The result of this processing is set in an RST-Reg 191. The content of the RST-Reg 191 is supplied as a signal RSTi to the switch SW-D and, at the same time, to a circuit (Test Logic) 192 for detecting special status of the result of the processing (0, $+$, $-$, carry, $>$, $<$, $=$, etc.). The Test Logic 192 detects such special status and sets it in a TST-Reg 193. The content of the TST-Reg 193 is supplied as a signal TSTi to a switch SW-T.

In the step 52, before the result of operation obtained in the step 51 is set in REG of the address indicated by a D operand address of the MP instruction corresponding to the operation, an operation similar to that for eliminating the REG access conflict in the step 46 is performed. Namely, in the present embodiment, also in this step, the number of simultaneous accesses to the same REG in D-REG is two at the largest as in the step 46, so that all D-REG accesses are divided into two groups (first and second D-REG groups).

That is, in ACCESS CONT shown in FIGS. 5A to 5G, the CARCTi register 85 in CARCT-CONTi of FIG. 5E outputs the contents of its bits $a+b+c+1$ to $a+b+c+d$ and supplies them as a signal Di to an AND circuit 74 in FIG. 5D. The AND circuit 74 supplies the content of the signal Di to the OR circuit 75 at the timing $T_{29}$. The output from the 1 OR circuit 75 is applied to the COMP LOG 76. As is the case with the operation of the step 46, in the COMP LOG 76 of FIG. 5F, the addresses of CM's from which each of first and second MP instruction groups for effecting the REG access have been read out, are respectively set in the $R_1$ and $R_2$ registers 103 and 104 at the timing $T_{29}$. First and second outputs from the COMP LOG 76 are supplied to the AND circuits 79 and 80 as in the step 46 and then supplied to an OR circuit 81 at the timings $T_{29}$ and $T_{32}$, respectively. The output signal SEL(1:l) from the OR circuit 81 is supplied to SW-R and CARCT-CONTi.

In the step 53, the switch SW-R is controlled so that the addresses in D-REG retained in DATA-Reg's of CM's corresponding to the first or second D-REG group, determined in the step 52, are transferred to an address register of REG whose address is indicated by the content of the REG address similarly retained. Further, the switch SW-D is controlled so that the results of operation in ALU corresponding to the first or second D-REG are transferred to write data registers of the REG's having the same addresses as the above.

That is, in FIG. 14D, the switch SW-R 5 fetches in th contents of TADR1 to TADRl supplied from data registers of CM1 to CMl and the content of SEL(1:l) supplied from ACCESS CONT. Only when the content of SEL(1:l) is "1", the switch SW-R 5 applies that part of the content of the signal INADRi corresponding to the address in D-REG to an output line Rk of the same number as the REG address k indicated by the D-REG address part of the signal ADRi which is one part of the signal TABDi and, at the same time, the switch SW-R 5 sets the content of an output line RRk at "1". Output lines R1 to Rm and RR1 to RRm of the switch SW-R 5 are respectively connected to the REG1 to REGm.

In FIG. 12, the REGi 12 fetches in the content of the output line Ri and sets it in an ADR-Reg 184.

In ACCESS CONT depicted in FIGS. 5A to 5G, the following operation is achieved in CARCT-CONTi of FIG. 5E in parallel with the above operation. Namely, the CARCTi register 85 supplies the contents of its bits $a+b+c+1$ to $a+b+c+d$ to an AND circuit 92, the output from which is supplied through the OR circuit 93 to the DEC 95 at the timing $T_{30}$ (in the case of the first D-REG group) or $T_{33}$ (in the case of the second D-REG group) from an OR circuit 88 only when the content of SEL(i) is "1". Thereafter, as in the step 49, the outputs ABD-1 to ABDm are obtained and supplied to the switch SW-D.

At this time, when all bits of the content of the signal ABDi are not "0", it indicates the address of ALU from which the result of its operation is to be transferred to the write register of the REGi. When all the bits are "0" it indicates that the result of operation need not be transferred to the write register of the REGi.

In FIG. 14C, the switch SW-D 9 fetches in the contents of signals RST1 to RSTn indicating the results of operation supplied from ALU1 to ALUn, and the contents of the abovesaid signals ABD1 to ABDm. The content of the signal RSTk of the same number as the address k indicated by the content of the signal ABDi whose all bits are not "0", is applied to a signal line Di at the timing $T_{30}$ (in the case of the first D-REG group) or $T_{33}$ (in the case of the second D-REG group).

In FIG. 12, the REGi 12 fetches in the content of the signal Di supplied as described above and sets it in the write data register (WDATA-Reg) 186.

In the step 54, the data set in the step 53 is written in the REG in accordance with the address similarly set in the step 53.

That is, in FIG. 12, only when the content of the signal RRi supplied from the switch SW-R is "1", the REGi 12 writes the content of the WDATA-Reg 186 in the address in the REGi indicated by the content of the ADR-Reg 184, at the timing $T_{31}$ (in the case of the first D-REG group) or $T_{34}$ (in the case of the second D-REG group).

An interface indicated by 187 is an interface between the present multipurpose I/O controller and the logic which will be made by a designer of an exclusive controller (for example, an interface logic with a channel unit or a magnetic disk unit, analog circuits, etc.). Therefore, it is desirable to employ, as a storage element of the REGi, a storage element of the type that the content set in the bits can be picked up directly by wire (for example, a flip-flop circuit) in the ratio of $\frac{1}{8}$ to $\frac{1}{4}$ of the storage capacity (for example, 8 bits × 16 words) of the REGi.

In FIG. 4C, the deciding operation indicated by 59 is of the same kind so that in the step 58. This checks whether the steps 52 to 54 have completed the REG write operation with respect to the first and second D-REG groups. If the operation has not yet been completed, the operation is returned to the step 52 and the steps 52 to 54 are repeated again. If the operation has already beem completed in connection with the two groups, the operation proceeds to the step 55. Accordingly, after the steps 52 to 54 are achieved twice, the operation proceeds to the step 55. In the present embodiment, however, this repetition is entirely controlled by timing as described above, so that there is no circuit which performs the operation of the step 59 as it is.

In the step 55, special status of the results of operations by ALU's, which is employed for modifying the addresses in CM strong therein MP instructions of the step after the next, is transferred to NAT CONT. For this purpose, the switch SW-T is controlled.

That is, in ACCESS CONT shown in FIGS. 5A to 5G, CARCT-CONTI of FIG. 5E supplies a comparator (COMP) 200 with the content of the bits 1 to a of the CARCTi register 85 (indicating the address i of CMi) and the content of NATi(a+1:2a) supplied from NAT CONT (the address k of CM from which the MP instructions of the next step are to be read out. In the case where CMi is included in sub-CG, the addresses k and i are not always the same. The addresses of and in CM from which the MP instruction of the step after the next are to be read out, contained in the MP instruction of the next step, are fetched in the NATK register in the step 39 of the next cycle (refer to FIG. 4B). Only when the contents of the both inputs are equal to each other, the COMP 200 outputs "1".

The output from the COMP 200 is supplied to an AND circuit 201, and an AND circuit 203 through a NOT circuit 202. Only when the content of TCST(i) is "1" and the content of the output from the COMP 200 is "1", the AND circuit 201 supplies the content of CARCTi(1:a) to an AND circuit 205 through an OR circuit 204. Further, only when the content of TCST(i) is "1" and the content of the output from the COMP 200 is "0", the AND circuit 203 supplies the content of NATi(a+1:2a) to the AND circuit 205 through the OR circuit 204. Consequently, the fact that all the bits of the output from the AND circuit 201 are not "0", implies that the MP instruction of the next step is read out in the step 38 of the next cycle and that the CM address and the address in CM from which the instruction of the step after the next are to be read out, contained in the above MP instruction, are fetched in NAT i in the step 39 of the next cycle (refer to FIG. 4A, 4B).

Accordingly, it is sufficient to write the special status of the operation of the current cycle in predetermined bits of NATi (in this step 55 of the current cycle).

On the other hand, the fact that all the bits of the output from the AND circuit 203 are not "0", implies that if the address indicated by the content of NATi-(a+1:2a) is taken as k, the MP instruction of the next step is read out from CMk (k≠i) in the step 38 of the next cycle and that the CM address and the address in CM from which instruction of the step after the next are to be read out, contained in the abovesaid instruction, are fetched in NATk in the step 39 of the next cycle. Accordingly, it is necessary that the special status of the operation in the current cycle be previously written in predetermined bits of NATk.

Next, the AND circuit 205 supplies the output from the OR circuit 204 to the decoder 94 through the OR circuit 207 at the timing $T_{35}$. Thereafter, the same operation as that of the step 50 is achieved until the output signals OT1 to OTl are obtained from the OR circuits 83-1 to 83-l in FIG. 5D.

Accordingly, the fact that all the bits of the output OTi are not "0" implies that the special status of the result of operation by ALU of the address indicated by the content of the output OTi is required to be set in predetermined bits of the NATi register. Further, the fact that all the bits of the output OTi are "0" implies that the abovesaid special status need not be set in the NATi register.

In FIG. 5D, the output signal lines OT1 to OTl from the OR circuits 83-1 to 83-l are connected to a switch SW-T.

Figure 14F:
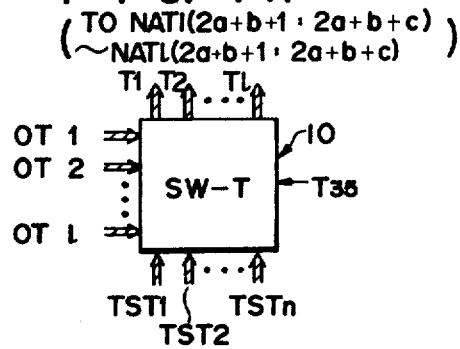

In FIG. 14F, the switch SW-T 10 fetches in the contents of the abovesaid signals OT1 to OTl and the contents of the signals TST1 to TSTn supplied from TST-Reg's 193 of ALU1 to ALUn. The content of the signal TSTK of the same number as the address K indicated by the content of the signal OTi that all the bits are not "0", is sent over an output line Ti at the timing $T_{35}$. Output signals T1 to T from the switch SW-T are supplied to NAT CONT.

In NAT CONT shown in FIGS. 6A to 6E, NATi-CONT of 6C fetches the abovesaid signal Ti and sets its content in the bits $2a+b+1$ to $2a+b+c$ of the NATi register 111.

After completion of the step 55, the operation is returned to the step 39 to start the operations following the step 39 of the next cycle (including the step 39).

Figures 16, 17:
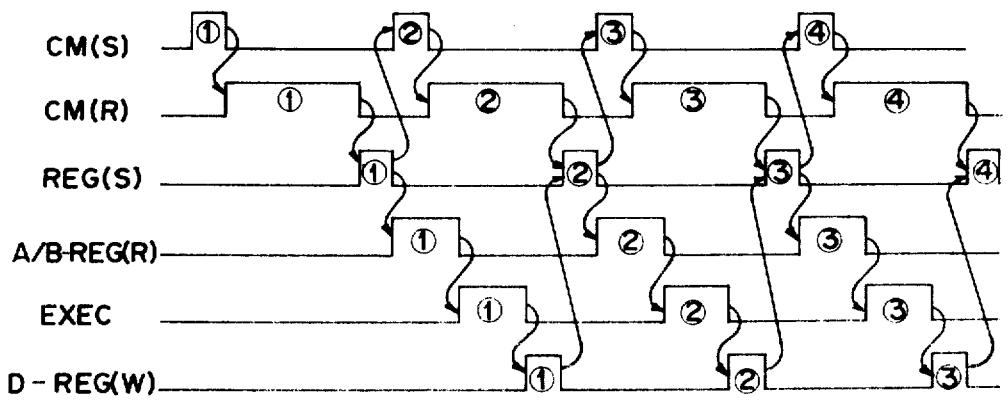
FIG. 16 is an explanatory diagram of the step groups of the flow chart of FIGS. 4A to 4C.
FIG. 17 is a time chart showing the time relationships between the step groups depicted in FIG. 16.

FIG. 16 shows the names of a series of step groups of the operation flow (FIG. 4A, 4B, 4C) described above and their step numbers and timing relationships. (The steps 31, 32 and 33 are omitted.)

FIG. 17 shows the time relationships among the step groups shown in FIG. 16.

Since this invention has such a construction as described above, it is possible to obtain an I/O controller having desired functions and processing efficiencies only by connecting an appropriate number of resources (CM's REG's and ALU's), writing microprograms in the CM's designation of a CG, designation of the number of ALU's to be allocated to each CG group and designation of the operation mode of each CG.

It will be apparent that many modification and variations may be effected without departing from the scope of the novel concepts of this invention.

I claim:

1. A multipurpose speed controllable processor comprising:
   a plurality of control memories (CM's) for storing microprograms including micro instructions comprising operand addresses and operation codes;
   a plurality of register groups (REG's) for storing the micro instructions, as well as data and the internal states of the processor;
   a plurality of arithmetic-logic units (ALU's) for executing the microinstructions;
   a control unit;
   a first switch means (SW-R) for transferring operand addresses from said plurality of control memories to said plurality of register groups;
   a second switch means (SW-A, SW-B) for transferring information from said plurality of register groups to said plurality of arithmetic logic units;
   a third switch means (SW-D) for transferring the results of operations from said plurality of arithmetic-logic units to the plurality of register groups;
   a fourth switch means (SW-O) for transferring operation codes from said plurality of control memories to said plurality of arithmetic-logic units;
   a fifth switch means (SW-T) for transferring the special status (+, −, 0, overflow, etc.) of the results of the operations in said plurality of arithmetic-logic units to said control unit;
   said control unit comprising means for controlling the execution of the microprograms by reading out the micro instructions making up the microprograms from the plurality of control memories, for transferring via the first switch means (SW-R) to the plurality of register groups a first address (A-address) and a second address (B-address) selected from three operand addresses (A-address, B-address and D-address) designated in the microinstructions, for reading out two input operands from the plurality of register groups in accordance with the first and second addresses, for transferring the two input operands to the plurality of arithmetic-logic units via the second switch means (SW-A, SW-B) and for transferring via the fourth switch means (SW-O) to the plurality of arithmetic-logic units operation codes designated in the read out micro instructions to execute the operations, for transferring the results of the operations to the plurality of register groups via the third switch means (SW-D) and for transferring the third address (D-address) to the plurality of register groups via the first switch means (SW-R) for writing the transferred operation results in the plurality of register groups in accordance with the transferred third address (D-address), for receiving via the switch (SW-T) information indicative of the special status of the results of the operations in the plurality of arithmetic-logic units, and for controlling a series of stages for determining addresses of micro instructions to be read out in the next cycle in accordance with the received special status information and addresses designated in the read out micro instructions;

said control unit further comprising means for dividing said plurality of control memories into valid control memories and invalid control memories; means for dividing the valid control memories (S) into a plurality (n) of control memory groups ($CG_1$, $CG_2$ ... $CG_n$), each group respectively including an arbitrary number $$(s_1, s_2, ... s_n, \sum_{i=1}^{n} s_i = S)$$

of valid control memories; means for allocating an arbitrary number $$(t_1, t_2, ... t_n, \sum_{i=1}^{n} t_i = T_0 = T)$$

of the plurality of arithmetic-logic units (T) to each group of the plurality of control memory groups; means for subdividing the valid control memories forming an arbitrary group ($CG_i$, $1 \leq i \leq n$) of the plurality of control memory groups into a plurality (q) of control memory sub-groups (sub-$CG_{i1}$, sub-$CG_{i2}$, ... sub-$CG_{iq}$), each control memory sub-group including an arbitrary number of control memories $$(r_{i1}, r_{i2}, ... r_{iq}, \sum_{j=1}^{q} r_{ij} = s_i, q = q(i) \geq t_i);$$

and means for setting one of either Go-On mode or a Wait mode of operation for each of the plurality of control memory groups;
   wherein, in accordance with the operation of said last mentioned five means, a control memory is selected from a control memory sub-group of each of the plurality of control memory groups at the same time, and one micro instruction is read out of each of the selected control memories at the same time (CM-READ stage); the read-out micro instructions are simultaneously executed in the ($t_i$) arithmetic-logic units allocated to that control memory group, the number of micro instructions simultaneously executed being equal to the number ($t_i$) of arithmetic-logic units allocated to that control memory group (EXECUTION stage); upon completion of the execution of all of the read out micro instructions, addresses of micro instructions to be read out in the next cycle are determined corresponding to the plurality of control memory sub-groups in accordance with the address parts of the read out micro instructions and the special status information of the results of the operations in the arithmetic-logic units allocated to each of the plurality of control memory groups (ADDRESS DETERMINATION stage); in the case of the plurality of control memory groups being each set in the Go-On mode, the CM-READ stage of the next cycle is immediately started to repeat its operation; and in the case of the plurality of control memory groups being each set in the Wait mode, the CM-READ stage is repeated after completion of the ADDRESS DETERMINATION stage of all the other control memory groups set in the Wait mode; whereby the execution speed of the microprograms is controllable by setting the number of the valid control memories, the number of the control memory groups, the number of the valid control memories included in each of the control memory groups, the number of the control memory sub-groups, the number of the control memories included in each of the control memory sub-groups, the number of arithmetic-logic units allocated to each of the control memory groups and the mode of operations of each of the control memory groups.

2. A multipurpose speed controllable processor according to claim 1, wherein said control unit further comprises:

ACCESS control means (ACCESS CONT) for selecting a plurality of microprograms from those of the microprogram instructions read out from each of said control memory groups, which are to be executed in the next execution cycle, for eliminating an access conflict to said plurality of register groups which may occur in the course of execution of said plurality of selected microprogram instructions, and for controlling all said switch means SW-A, SW-B, SW-D, SW-R, SW-O and SW-T for transferring varied information among said pluralities of control memories, register groups, arithmetic-logic units, and said control unit;

NAT control means (NAT CONT) for determining addresses of said control memories to read out in the next cycle;

CGPT control means (CGPT CONT) for determining addresses of said control memories having stored therein a plurality of microprogram instructions to read out in the next cycle, based on set values of said control memory groups;

ECRT control means (ECRT CONT) for retaining the addresses of said control memories having stored therein the plurality of microprogram instructions to be read out in the next cycle, and for retaining and controlling the addresses of said control memories having stored therein the plurality of micro-program instructions which have already been read out therefrom but have not yet been executed;

Wait/Go-On control means (Wait/Go-On CONT) for determining the control memory groups to be read out in the next cycle based on set values of the operation mode of the control memory groups and the addresses of the plurality of control memories retained in said ECRT control means; and EXEC control means (EXEC CONT) for retaining the set value of the control memory groups, the set value of the number of arithmetic-logic units to be allocated to each of the control memory groups, the set value of the operation mode of each of the control memory groups and the set value of the execution starting addresses of the microprograms stored in the control memories, and generating various timing signals to thereby control the execution of said pluralities of control memories, register groups, arithmetic logic units, switches, and all of said control means (CONT's).

3. A multipurpose speed controllable processor according to claim 2 wherein said ACCESS CONT comprises:

Total CM Selection Table control means (TCST CONT), and

CM-ALU-REG Connection Table and Conflict control means (CARCT & CONFLICT CONT), said TCST CONT comprising:

means for determining, with respect to each of said control memory groups, an address group of the control memories in which there is stored microprogram instructions which have been read out therefrom, but not as yet executed, a CSTi register group (CM Selection Table i, i = 1, 2, . . . l) for retaining said address group corresponding to each of said control memory groups;

means for selecting the same number of addresses as said arithmetic-logic units assigned to the control memory group i, starting with the lowest-number of a plurality of addresses stored in said CSTi register group;

a PCSTi register group (Pseudo CSTi, i = 1, 2 . . . l) for retaining said selected addresses;

means for obtaining the OR product of the contents of the l PCSTi register group to determine the address group of said control memories having stored therein microprogram instructions to be executed in the next cycle; and a TCST register (Total CST) for retaining said determined address group; and said CARCT & CONFLICT CONT comprising:

means for fetching the three addresses of the register groups (REG's) having stored therein the three operands of microprogram instructions stored in the data registers of said plurality of control memories having been read in the current cycle;

a CARCTi register group (CM-ALU-REG Connection Table i, i = 1, 2, . . . l) for retaining said three addresses, the addresses of said control memories, and the addresses of said arithmetic-logic units for executing the microprogram instructions read out from said control memories;

means for producing signals for controlling said switch means SW-A, SW-B, SW-D, SW-O and SW-T based on the content of said CARCTi register group (i = 1, 2, . . . l);

means for eliminating an access conflict in the register groups during access of the operand group of the microprogram instruction group to be executed in the current cycle, based on the contents of said CARCTi register group and said TCST register; and means for producing a signal for controlling said switch means SW-R based on the output from said access conflict eliminating means and sending said signal to said switch means SW-R.

4. A multipurpose speed controllable processor according to claim 2, wherein said NAT CONT comprises:

means for fetching the l execution start addresses of the microprogram instructions stored in the control memories i (i = 1, 2, ... l), said l execution start addresses being retained in said EXEC CONT;

means for fetching the next address parts of the microprogram instructions having been read in the current cycle;

NATi registers (Next Address Table i, i - 1, 2, ... l) for retaining said next address parts, the address of said control memories, and the results of execution of microprogram instruction of the immediately preceding step;

means for transferring a next address part of said next address parts to an NATj register having j equal to the content of the control memory address part of the next address part when i of the NATi and the content of the control memory address part are different from each other;

means for transferring to said CGPT CONT the contents of the control memory address parts of the NATi register and the NATj register;

means for modifying the address in the control memory of the fetched-in addresses based on the content of an execution result part of the NATi register; and means for sending out the content of the fetched-in address part of the NATi register to the control memory i.

5. A multipurpose speed controllable processor according to claim 2, wherein said CGPT CONT comprises:

means for fetching set values of said control memory groups, the operation mode of said control memory groups, and the invalid control memory group retained in said EXEC CONT;

CGPTi registers (CM group Pattern Table i, i = 1, 2, ... l) for retaining said set values, and a signal (R) from said Wait/Go-On CONT for determining whether said control memory group is to be read in the next cycle;

means for fetching a signal concerning said control memory sub-groups supplied from said NAT CONT, capable of setting and resetting corresponding bits of said CGPTi registers;

a UCRT register (Used CM Resource Table) for retaining the addresses of all the control memories whose addresses are set in said CGPTi registers; and means for providing the OR product of the control memory groups in all of said CGPTi registers wherein the R signal retaining part of the CGPTi registers is "1", to produce the addresses of said control memories to be read in the next control memory read cycle, said addresses being sent to said ECRT COMT.

6. A multipurpose speed controllable processor according to claim 5 wherein said ECRT CONT comprises:

means for fetching the control memory address to be read next, which are supplied from CGPT CONT;

a PECRT register for retaining the control memory address to be read next;

an ECRT register (Execution CM Resource Table) for retaining the addresses of the control memories having stored the microprogram instructions which have been read out therefrom but have not as yet been executed;

means for providing the OR product of the content of signal from said CGPT CONT with the content of said ECRT register, and entering the resulting OR output back in said ECRT register again;

means for fetching a signal of the addresses of the control memory forwarded from said ACCESS CONT and having stored therein the microprogram instructions to be executed in the present cycle, providing the exclusive OR product of the content of the signal of the addresses with the content of said ECRT register and entering the resulting product output back in said ECRT register again; and means for forwarding the content of said PECRT register to said ACCESS CONT and control memories.

7. A multipurpose speed controllable processor according to claim 6, wherein said Wait/Go-On CONT includes means for fetching the content of the control memory groups of the CGPTi registers as forwarded from said CGPT CONT and the content of the ECRT register as forwarded from said ECRT CONT, for providing the AND product of said two contents of each bit, for producing a signal R for setting an R signal retaining part of said CGPTi register and forwarding said signal R to said CGPT CONT when all bits of the AND outputs are "0" and when the content of an operation mode part signal of the CGPTi, register forwarded from said CGPT is "1" (Go-On mode), and for producing a signal R for setting said R signal retaining part of each of said CGPTi registers corresponding to all the control memory groups and forwarding said signal R to said CGPT CONT when the content of said operation mode part signal is "0" (Wait mode) and only when all bits of all said AND outputs corresponding to all the other control memory groups are "0".

8. A multipurpose speed controllable processor according to claim 2, wherein said EXEC CONT comprises:

an OCGPTi register group (Original CGPTi, i = 1, 2, ... l) of which contents are forwarded to said CGPT CONT for retaining the addresses of all the control memories forming the control memory group i, the validity of said control memory group i, and the operation mode of the control memory group i, in accordance with their setting;

ICATi registers (Initial CM Address Table i, i = 1, 2, ... l) of which contents are forwarded to said NAT CONT for retaining the start addresses of the microprograms stored in the control memories, in accordance with their setting; and means for generating timing signals being forwarded to said ACCESS CONT, said NAT CONT, said CGPT CONT, said ERCT CONT and said Wait/go-On CONT.

9. A multipurpose speed controllable processor according to claim 3, wherein said access conflict eliminating means eliminates an access conflict when the number of simultaneous accesses to one of said register groups is a maximum of 2, said access conflict eliminating means comprising:

$$l(l-1)/2(=(l-1) + (l-2) + \ldots + 1)$$

comparator circuits for comparing ai and aj with each other ($i > j$, $i = 1, 2, \ldots l-1$; $j = 2, 3, \ldots l$) if the contents of l operand address parts contained in l microprogram instructions read out from l control memories (CM1, CM2, ... CMl) are taken as $a_1, a_2, \ldots a_l$, respectively;

(l−1) OR circuits for obtaining OR outputs $$\overset{l}{\underset{j=i+1}{v}}$$

aij ($i = 1, 2, \ldots l-1$) if the result of comparison of ai and aj is taken as aij;

a register $R_1$ for retaining said control memory address (i) corresponding to the register group address (ai) of an operand included in an access group 1;

a register $R_2$ for retaining similar addresses of operands included in an access group 2; and means for setting "1" in a bit i of said register $R_1$ when said output $$\overset{l}{\underset{j=i+1}{v}}$$

aij is "1", setting "1" in a bit i of said register $R_2$ when said output $$\overset{l}{\underset{j=i+1}{v}}$$

aid is "0" and setting bits l of said registers $R_1$ and $R_2$ at "0" and "1", respectively at all times.

* * * * *